(12) United States Patent
Mauro

(10) Patent No.: US 7,512,452 B2
(45) Date of Patent: Mar. 31, 2009

(54) POSITIONING SYSTEM FOR ELIMINATING LOST MOTION EFFECT

(76) Inventor: George E. Mauro, 16 Northwestern Dr., Salem, NH (US) 03079

( * ) Notice: Subject to any disclaimer, the term of this patent is extended or adjusted under 35 U.S.C. 154(b) by 425 days.

(21) Appl. No.: 11/151,081

(22) Filed: Jun. 13, 2005

(65) Prior Publication Data
US 2006/0282179 A1 Dec. 14, 2006

(51) Int. Cl.
 *G05B 19/18* (2006.01)
(52) U.S. Cl. ............................................. 700/60; 700/61
(58) Field of Classification Search ............... 702/179; 355/53, 55, 72, 77; 700/56, 54, 193, 57, 700/60, 61, 69, 186
See application file for complete search history.

(56) References Cited

U.S. PATENT DOCUMENTS

| 3,330,964 | A |   | 7/1967  | Hobrough et al. |         |
|-----------|---|---|---------|-----------------|---------|
| 4,074,131 | A |   | 2/1978  | Schwebel        |         |
| 4,385,838 | A | * | 5/1983  | Nakazawa et al. | 356/399 |
| 5,151,749 | A | * | 9/1992  | Tanimoto et al. | 356/620 |
| 5,369,488 | A | * | 11/1994 | Morokuma        | 356/493 |
| 5,521,036 | A | * | 5/1996  | Iwamoto et al.  | 430/22  |
| 6,134,007 | A | * | 10/2000 | Naraki et al.   | 356/498 |
| 6,430,465 | B2|   | 8/2002  | Cutler          | 700/193 |
| 2002/0135776 | A1 | * | 9/2002 | Nishi       | 356/500 |
| 2002/0140296 | A1 | * | 10/2002 | Ebihara    | 310/12 |
| 2003/0158701 | A1 | * | 8/2003 | Yasuda et al. | 702/179 |
| 2004/0233407 | A1 | * | 11/2004 | Nishi et al. | 355/53 |
| 2005/0151947 | A1 | * | 7/2005 | Fujimaki    | 355/55 |

FOREIGN PATENT DOCUMENTS

| DE | 39 09 855 A1  | 9/1990  |
| DE | 195 11 973 A1 | 12/1996 |
| EP | 0 482 553 A2  | 4/1992  |

OTHER PUBLICATIONS

Michael J Bujold, Interview Summary, Jun. 13, 2005.*

* cited by examiner

*Primary Examiner*—Albert DeCady
*Assistant Examiner*—Darrin Dunn
(74) *Attorney, Agent, or Firm*—Davis & Bujold, P.L.L.C.

(57) ABSTRACT

A mechanism for determining the position of a point relative to a coordinate system defined by coordinate scales aligned along coordinate axes includes a coordinate reference plane and a coordinate read plane and a read mechanism associated with each coordinate scale. Each read mechanism is engaged with the coordinate read plane and the coordinate reference plane to be responsive to relative motion between the coordinate read plane and the coordinate reference plane to indicate a position of the point on the along the corresponding coordinate scale, and is coupled to the coordinate read plane and to the coordinate reference plane to allow relative transverse motion between the coordinate read plane and the corresponding coordinate axis. Each read mechanism includes a guide mechanism for retaining the read mechanism at a predetermined position along an axis transverse to the corresponding coordinate axis with transverse motion between the coordinate read plane and the coordinate reference plane.

18 Claims, 7 Drawing Sheets

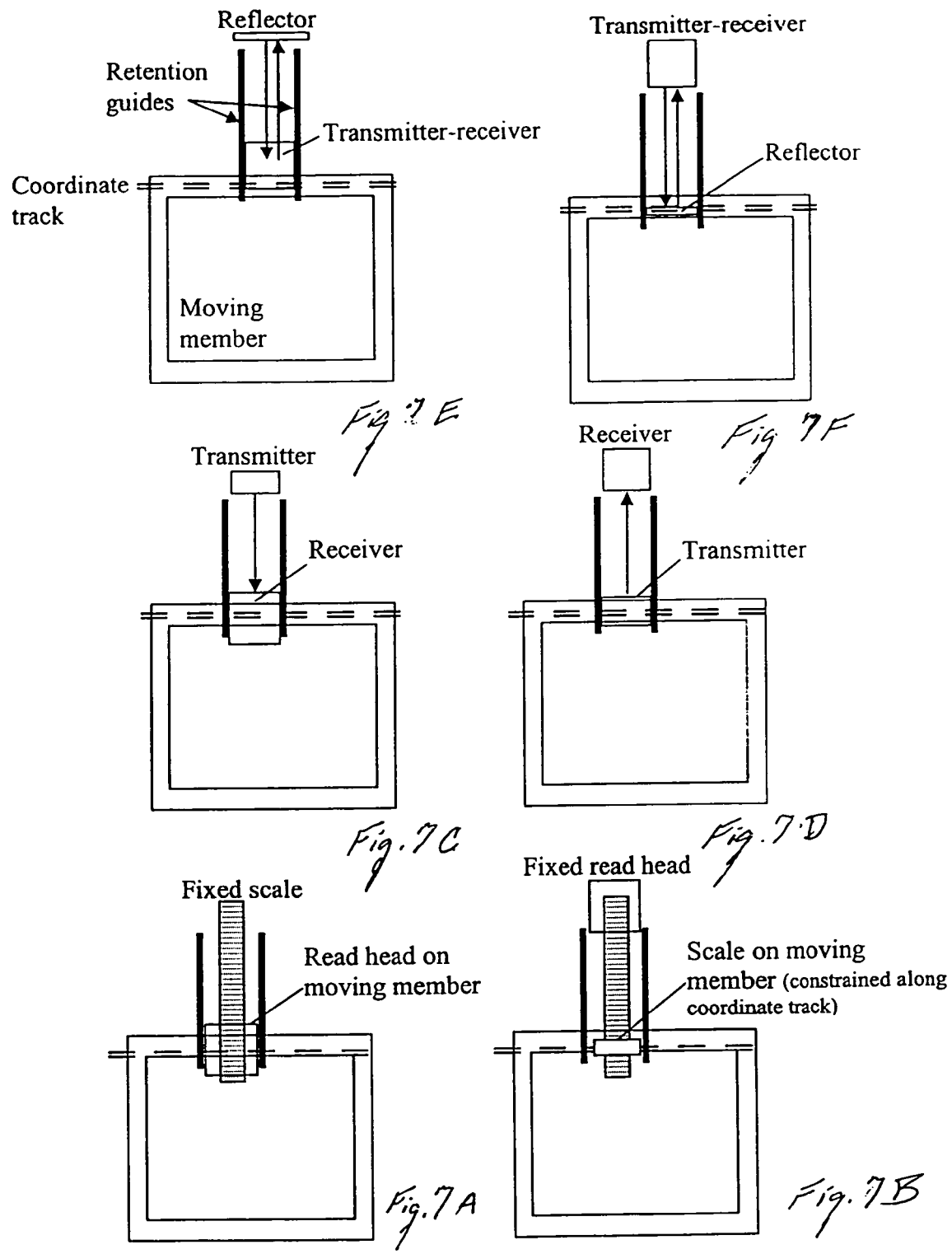

US 7,512,452 B2

POSITIONING SYSTEM FOR ELIMINATING LOST MOTION EFFECT

FIELD OF THE INVENTION

The present invention relates to a system for eliminating the effect of lost motion when moving a positioning system from a first position to a second position. More particularly, the present invention relates to a system and method which minimizes and controls or ignores Abbe error and quantifies the error and/or leaves only quantifiable mechanical error and/or can be used to quantify other mechanical errors as repeatable corrections or deviations that can be dealt with mathematically or mapped into a usable coordinate system.

BACKGROUND OF THE INVENTION

There are a variety of mechanical positioning systems in use in the prior art for various purposes, and the common function and requirement of such systems is the accurate and repeatable positioning of a workpiece The majority of such positioning systems include a positional central platform or table to which the workpiece is mounted while the platform is in turn coupled to X-axis and Y-axis motors or drivers which move the platform or table along the corresponding X-axis or Y-axis X axis. Positioning errors occur, however, when the table or platform is moved from a first position to a second position and, depending upon the positioning accuracy required by the system, can be quite significant, thereby severely limiting the usefulness of such positioning systems.

Such positioning errors arise from a number of causes, the majority of which are based in the limitations of mechanical bearing, measuring and drive systems and are commonly referred to as Abbe errors. For the purposes of the present discussions, Abbe error may be defined as an error resulting where a measurement scale line does not intersect the viewing point of the subject of the measurement. In general, an Abbe error is proportional to the distance between the line of the measurement scale and the line of the viewpoint of the subject of the measurement. For example, the X-axis and Y-axis drives are typically separate motors or other mechanical driving devices and usually generate rotational motions that are turned into separate linear motions along the X- and Y-axis. In as much as it would be very unusual for two separate drive devices and their associated drive trains to be identical, there will be some error, such as small rotational errors of the drives, tolerances in the drive trains, frictional differences between the drive trains, and strictional losses, which will translate linear movement errors at the table or platform. As a result, such Abbe error(s) may, for example, result in the orientation of the repositioned table or platform becoming slightly skewed or misaligned by a small percentage of a degree or so. While such errors are typically small, and may cancel each other to an extent, the errors will still probably be significant in terms of the sought after accuracies in table movement and positioning, such as when the system is trying to control the movement of the table or platform to a new desired position as precisely as possible, e.g., within a half of a micron or so.

SUMMARY OF THE INVENTION

Wherefore the present invention is directed at providing a positioning system which substantially minimizes or eliminates the lost motion effect of positioning systems and thereby reduces the Abbe error when reposition or moving the table or platform from a first location to another desired second location.

Another object of the present invention is provide to a system and method which minimizes and controls or ignores Abbe error and quantifies the error and/or leaves only quantifiable mechanical error and/or can be used to quantify other mechanical errors as repeatable corrections or deviations that can be dealt with mathematically or mapped into a usable coordinate system for use in accurately positioning an object at precisely the desired location, e.g., within a half of a micron or so.

A further object of the present invention is to associate a pair of orthogonally arranged encoder scales with the reference surfaces of the table or platform so that movement of the table or platform, relative to the pair of encoder scales, can be precisely detected and utilized to ensure that the table or platform is quickly, precisely and accurately moved to the desired new location. Any significant deviation from true orthogonality can also be compensated for to reflect those deviations.

It may be further realized from the above that, according to the present invention, the relationship or response of the position of the table or an object thereon to the measurement scale or according to the measurement scale can be calibrated to reflect a true measurement along the coordinate with which the measurement scale is associated.

COMPILE REMAINDER OF SUMMARY FROM CLAIMS

Brief Description of the Drawings

The invention will now be described, by way of example, with reference to the accompanying drawings in which.

DETAILED DESCRIPTION OF EMBODIMENTS OF THE INVENTION

The following will first describe the principles and fundamental mechanisms of the present invention, illustrating the discussion with a discussion of an exemplary system of the prior art and the problems associated therewith and a descriptions of an exemplary implementation of the present invention. These discussions will be followed by further descriptions of additional and extended implementations of the mechanisms and methods of the present invention.

A. Introduction—Systems and Problems of the Prior Art

Figure 1A:
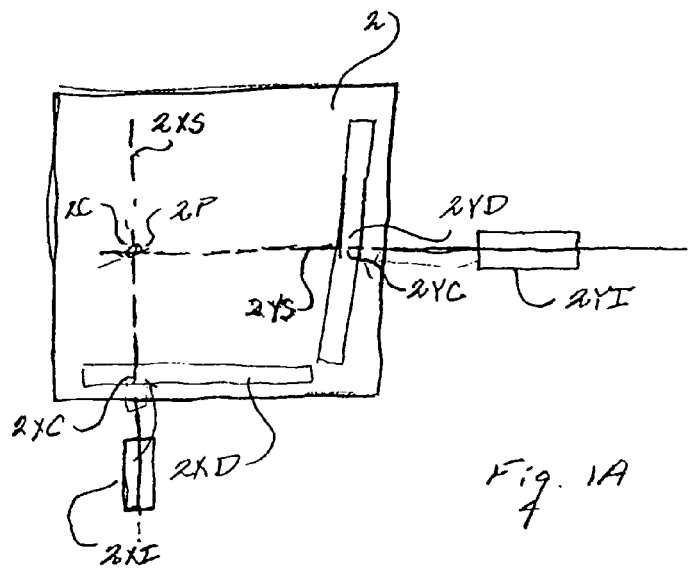
FIGS. 1A and 1B are a diagrammatic illustrations of a positioning system of the prior art.
Figure 1B:
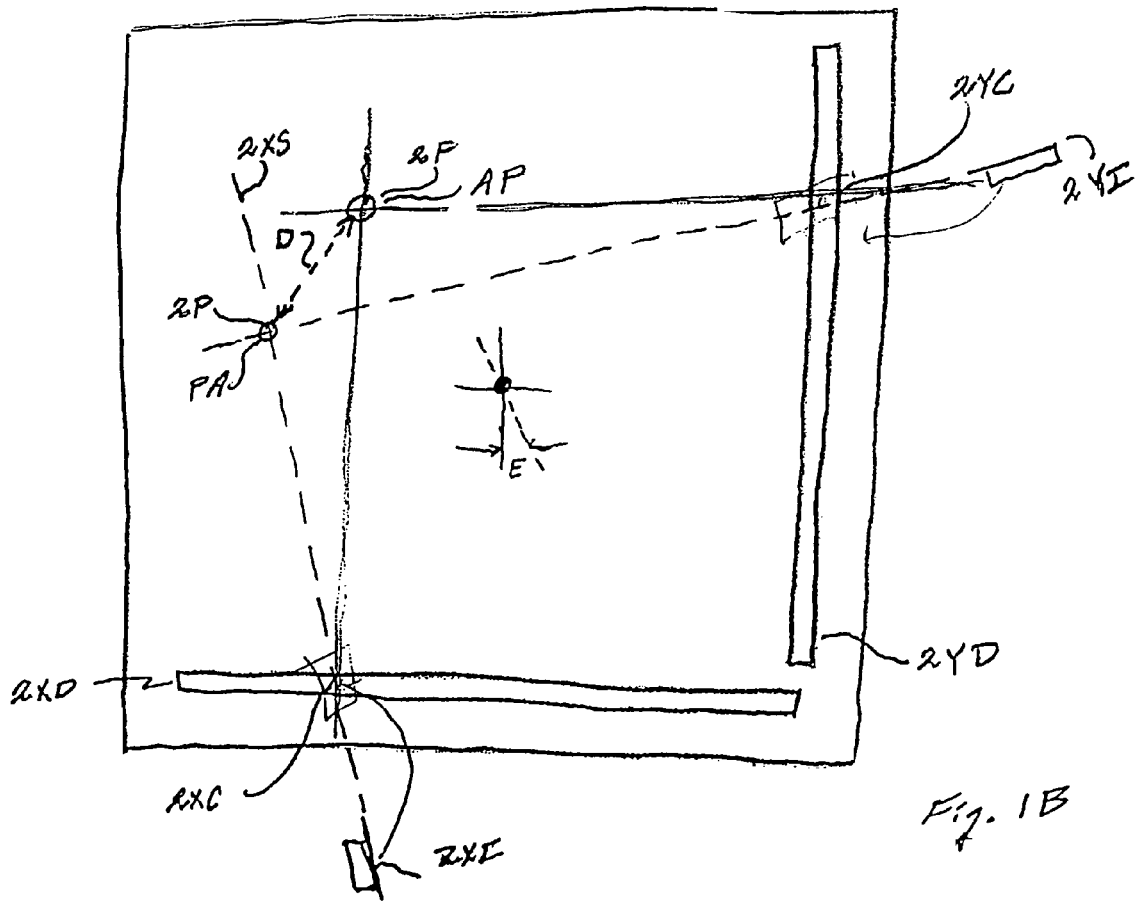

Referring first to FIGS. 1A and 1B, which are diagrammatic illustrations of a typical system of the prior art and briefly considering the problems of the prior art that are illustrated therein, it has been described above that a significant source of errors in the positioning of a workpiece positioning table 2 arises from Abbe errors, which may be briefly described as small rotational errors resulting in substantial linear errors in the movement of the table.

In a conventional table positioning system as illustrated in FIG. 1A, a workpiece and the dimensional scales 2XD and 2YD for measuring and indicating linear position of the workpiece along the X-axis and the Y-axis are typically mounted on a work table 2 while indicators 2XI and 2YI for reading the table 2 position along the X-axis 2X and the Y-axis 2Y from the X and Y dimensional scales 2XD and 2YD, often referred to as "optical fences", are typically mounted separate from the table 2 and are thereby separated from both a point 2P whose position is to be determined and the scales 2DX and 2DY by a significant distance. As a consequence, if the orientation of a table 2 becomes slightly skewed or misaligned by an error angle due to small errors in the linear X-axis 2X and Y-axis 2Y movement of the table 2, these errors will translate into significant linear errors over the distance between the scales and indicators and the point 2P whose position is being measured.

As illustrated in FIG. 1A, the determination of the X-axis 2X position of a point 2P on the table 2 of a conventional table positioning system may be regarded as determining the position of point 2P on the table 2 by means of an X-axis sight line 2XS parallel to the Y-axis 2Y of the table 2 and a Y-axis sight line 2YS parallel to the Y-axis 2Y of the table 2. Considering the X-axis sight line 2XS alone, for purposes of simplicity of discussion, the X-axis sight line 2XS is in theory a straight line extending from indicator 2XI and to and through an X-axis crossing point 2XC on the linear dimensional scale 2XD affixed to the table 2 and to the point 2P on the table 2 whose position is to be determined. In theory, therefore, the point 2C at which the sight line 2XS crosses the scale 2XD is the position on table 2 of the point 2P along the axis represented by that scale. It should also be noted that point 2C and also represents the position of table 2 along that axis with respect to the scale 2XD.

In actual practice, however, and as illustrated in FIG. 1B, an erroneous rotation or skewing of the table, such as by error angle E will result in the sight line 2XS crossing the scale 2XD at a point XE that is displaced from the true crossing point 2C by a distance that is dependent upon the degree of rotation of error angle E and the distances from the indicator 2XI to the scale 2XX and from the scale 2XD to the point 2P on table 2. As illustrated in FIG. 1B, this displacement error D along the scale 2XD in turn appears as a difference between the actual position PA of the point 2P on table 2 and the apparent position AP of the point 2P on table 2 with respect to the scale 2XD, and is thereby a positioning error of the point 2P on the table 2 along the X-axis 2X. This error is often severely compounded by such factors as the distance between the plane of the indicator and the plane of the scale and the table, and so on, as such factors introduce yet another plane or planes in which erroneous displacements or rotations can appear.

B. Illustrative Embodiment of the Present Invention in the X/Y Plane

Figure 2:
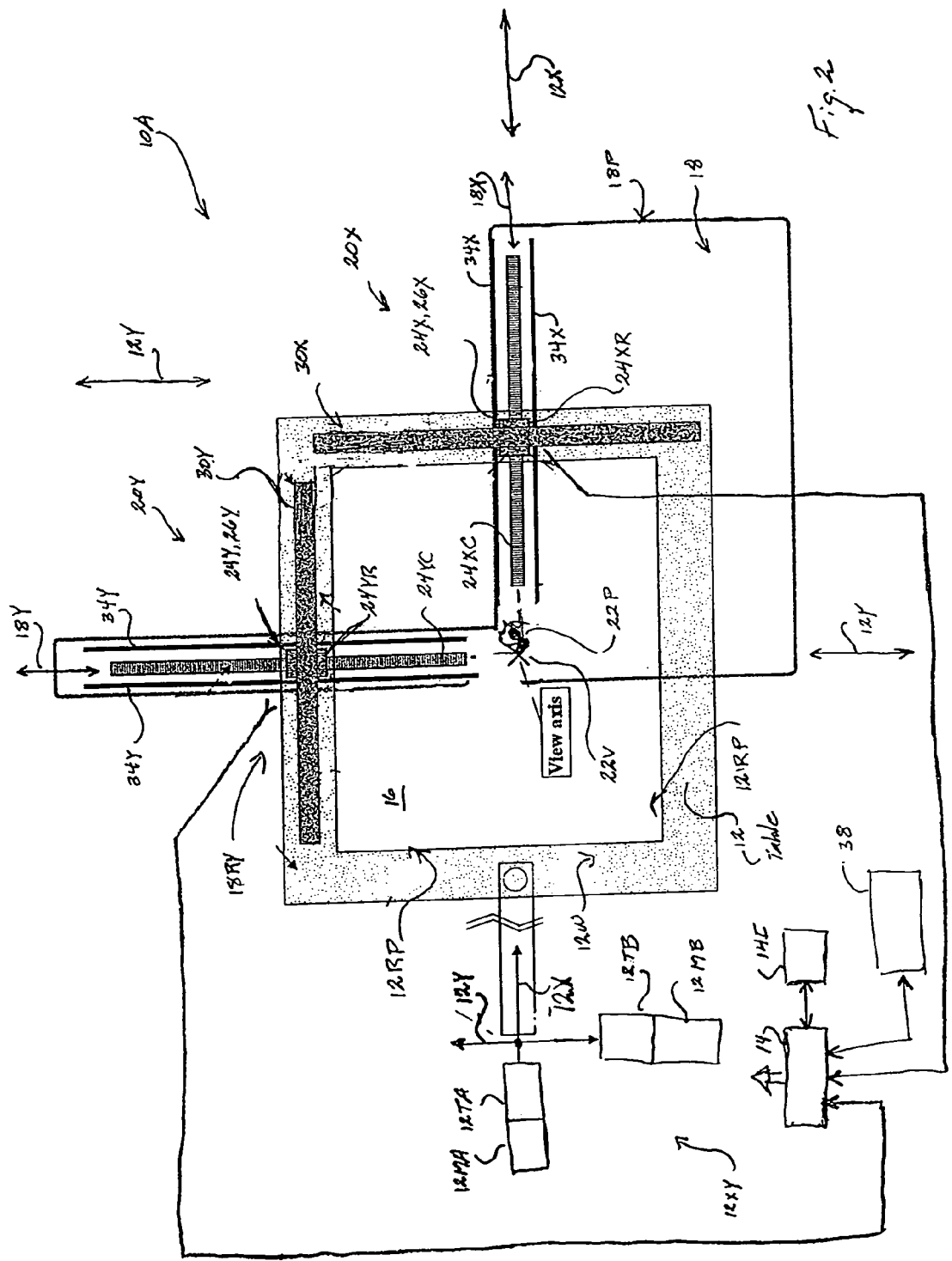
FIG. 2 is diagrammatic illustration of an embodiment of a positioning system of the present invention.

Referring to FIG. 2, therein is illustrated an exemplary embodiment of the present invention in a two dimensional position measurement and portioning system 10A. It must be noted, however, that the illustrative and exemplary embodiments that are described next below are shown to illustrate the principles of the present invention and that the present invention may be embodied in yet other implementations. Certain illustrative examples of such embodiment will be described after the description of the following exemplary embodiment.

Figure 3:
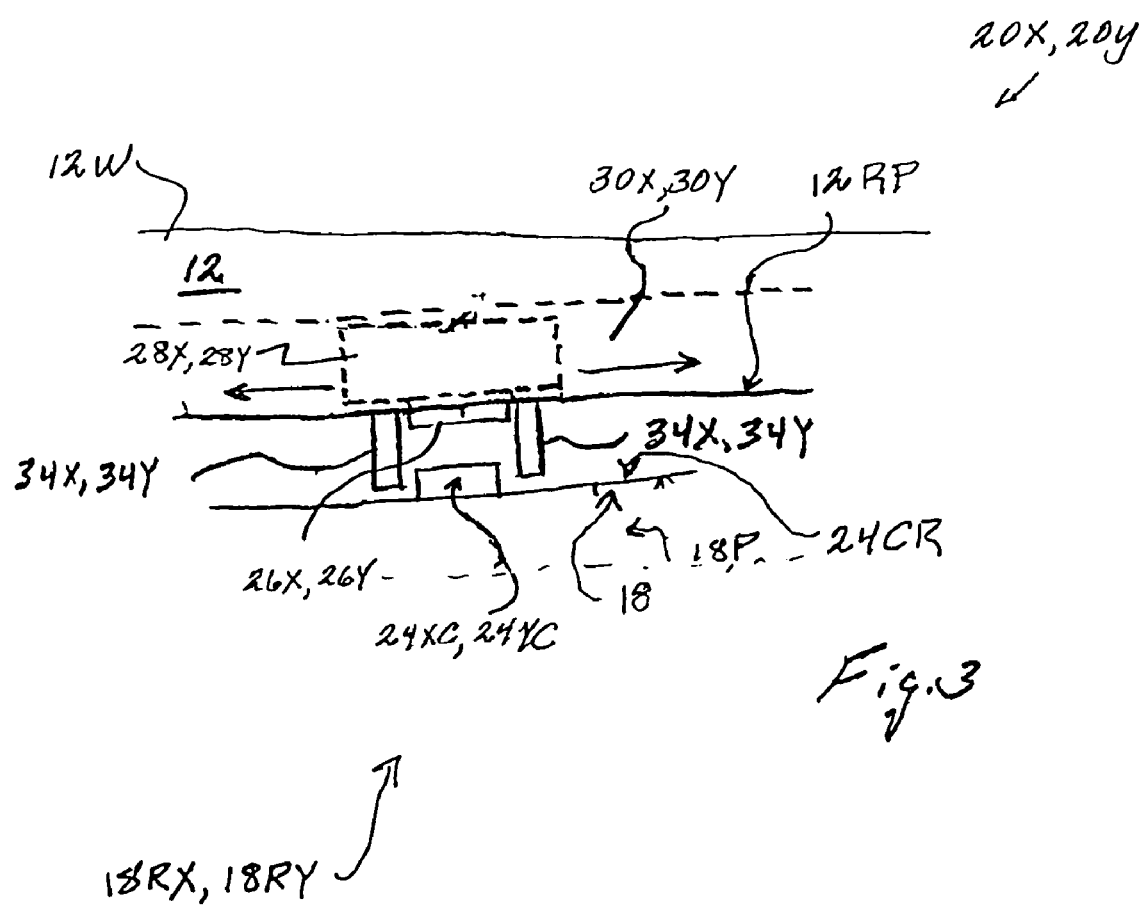
FIG. 3 is a cross section view of a two dimensional implementation of a system of the present invention.

First briefly considering the basic structure and mechanism of the exemplary and illustrative embodiment of the present invention as shown in FIGS. 2 and 3, a positioning system 10A generally includes a movable positioning table 12, which may also be referred to as a platform, frame or support, which is separately or jointly movable along the X-axis 12X and a Y-axes 12Y by remote X- and Y-manipulator mechanisms, such as rotational motors with drive trains. In other embodiments, such as illustrated in FIG. 1, these mechanisms may be combined into a single XY positioning device 12XY. XY positioning device 12XY may include a first positioning motor or drive 12MA acting through a drive train 12TA (diagrammatically shown) to move the positioning table 12 along X-axis 12X, and a second positioning drive 12MB acting through a drive train 12TB to move the positioning table 12 along Y-axis 12Y.

In a typical positioning system 10 a computer 14 is coupled to both drives 12MA and 12MB to control the operation of the system, and the computer 14 is typically coupled to an input device 14l, e.g., a keyboard, mouse, etc., to facilitate an operator inputting commands to the computer 14 and the associated drives 12MA and 12MB to facilitate automatic automated movement of the positioning table 12 from a first location to a desired second location. The computer control of a positioning system 10 is conventional and well known in the art, however, so that a further detailed discussion concerning the same is not required or provided.

It will be appreciated that a positioning table 12 can have a wide range of different arrangements or configurations, depending upon the uses and functions of the positioning table 12, the nature of the workpieces to be operated upon on the positioning table 12, and the nature of the operations to be performed. For example, a positioning table 12 may have a window with an aperture 16 extending completely through a central region of the table 4. The aperture 16 may, for example, measure 3 inches by 3 inches, 8 inches by 8 inches, or 4 inches by 8 inches, and so on. Alternatively, the positioning table 12 may comprise a flat or contoured frame, platform, work surface or other form of surface which is moveable from one position to another. As the present invention has a variety of different applications, it is to be appreciated that the term "table" is not to be limited by the specifically disclose arrangements disclosed herein but is to be broadly construed to mean any surface or structure utilized to move and position any object, item, device, component, etc. relative to the reference surface.

According to the present invention, the measuring system 10A includes a coordinate reference plane 18 that in the illustrated exemplary embodiment is separate from positioning table 12. As shown in the exemplary embodiment of the invention as illustrated in FIGS. 2 and 3, in the present exemplary embodiment coordinate reference plane 18 is located on the "front" side of a reference plate 18P to be parallel to and closely adjacent to a corresponding face of positioning table 12. In presently preferred embodiments, reference plate 18P may be, for example, a glass, metal or stone plate, such as granite, having an optically flat surface for coordinate reference plane 18 and, preferably, a low coefficient of expansion and contraction with temperature.

As illustrated in FIGS. 2 and 3, a coordinate read plane 12RP is in turn located on the "back" side of positioning table 12, so that coordinate read plane 12RP is close to and coplanar with coordinate reference plane 18. It will be noted that the work plane 12W of positioning table 12 to which a workpiece is fastened comprises the "front" surface of positioning table 12.

Further according to the present invention, a positioning system 10A of the present invention includes an X-axis coordinate mechanism 20X and a Y-axis coordinate mechanism 20Y. As will be described next below, X-axis coordinate mechanism 20X and a Y-axis coordinate mechanism 20Y respectively function to determine the X-axis and Y-axis coordinate position 22 of a point 22P on the work plane 12W comprising the "front" surface of positioning table 12, and thus of a workpiece fastened to work plane 12W.

X-axis coordinate mechanism 20X and a Y-axis coordinate mechanism 20Y may thereby operate with the X- and Y-manipulator mechanisms, such as positioning device 12XY, to determine the location of point 22P by moving positioning table 12 so that point 22P is located at a viewing point 22V, which is typically at the origin point of the X/Y coordinate reference grid defined by X-axis coordinate mechanism 20X and Y-axis coordinate mechanism 20Y, as will be discussed in detail below. The X/Y coordinates of the point 22P may then be determined by reading the X- and Y-offsets or displacements required to move the point 22P to the viewing point 22V from the X-axis coordinate mechanism 20X and a Y-axis coordinate mechanism 20Y. Viewed in another way, X- and Y-axis coordinate mechanisms 20X and 20Y and the X- and Y-manipulator mechanisms may be used to move a selected point 22P on positioning table 12 or on an object mounted onto positioning table 12P to the viewing point 22V, which may be the focus or operating point of, for example, a microscope or a tool, such as a laser machining device or a mechanical machining device.

The component elements of an X-axis coordinate mechanism 20X of the present invention include an elongate X-axis coordinate encoder scale 24XC with a corresponding X-axis read mechanism 24XR and the component elements of a Y-axis coordinate mechanism 20Y include an elongate Y-axis coordinate encoder scale 24CY with a corresponding Y-axis read mechanism 20XR.

As shown, encoder scale 24XC and encoder scale 24YC are mounted on or in or made as part of coordinate reference plane 18 to define a stable coordinate reference plane 24CR having a stable X/Y coordinate reference grid from which the X and Y coordinate position of positioning table 12 and thus the position 22 of a point 22P on the positioning table 12 may be measured. As may be seen, therefore, coordinate reference plane 24CR and the coordinate reference grid are thereby located parallel to and closely adjacent to coordinate reference plane 18.

As illustrated, X-axis encoder scale 24XC and Y-axis encoder scale 24YC are typically mounted at 90° to one another, although in other embodiments, as discussed below, the X-axis encoder scale 24XC and an Y-axis encoder scale 24YC may be mounted at other angles relative to one another or one or both of X-axis encoder scale 24XC and an Y-axis encoder scale 24YC may be curved or may form an arc. As described with regard to coordinate reference plane 18, encoder scales 24XC and 24YC may be comprised of, for example, glass, metal, a stone such as granite or marble, and will preferably have a low coefficient of expansion and contraction with temperature As also illustrated in FIGS. 2 and 3, the X-axis read mechanism 24XR and the Y-axis read mechanism 24YR respectively include an X-axis read head 26X and a Y-axis read head 26Y. As will be discussed in further detail in the following, the function of X-axis read head 26X and Y-axis read head 26Y is to read encoder scales 24XC and 24YC, respectively, to determine the X- and Y-coordinates of positioning table 12 and thus of a point 22P on positioning table 12 with respect to the absolute and stable coordinate reference plane 24CR and X/Y coordinate grid defined by encoder scales 24XC and 24YC. For this purpose, X-axis read head 26X and Y-axis read head 26Y are respectively mounted on an X-axis slide member 28X and a Y-axis slide member 28Y, which are in turn are slidably mounted to coordinate read plane 12RP in such a way as to be able to travel freely along encoder scales 24XC and 24YC, respectively, as positioning table 12 is moved along X-axis 12X and Y-axis 12Y.

For this purpose, and as illustrated further in FIGS. 2 and 3, each of read heads 26X and 26Y is mounted on a corresponding slide member 28, respectively designated as X-axis slide member 28X and Y-axis slide member 28Y. X-axis slide member 28X and Y-axis slide member 28Y each rides in and moves freely along a corresponding head track 30, designated respectively, as head tracks 30X and 30Y. In a presently preferred embodiment, each slide member 28 rides on a plurality of bearings (not shown) which facilitate substantially free and uninhibited sliding movement of the slide member 28 along the corresponding head track 30.

As shown, head track 30X is perpendicular to X-axis encoder scale 24XC, and thus is parallel to Y-axis encoder scale 24YC while head track 30Y is typically generally perpendicular to Y-axis encoder scale 24YC and is thus parallel to X-axis encoder scale 24XC. In the presently illustrated embodiment head tracks 30X and 30Y are typically cut into coordinate read plane 12RP, most typically, adjacent a corresponding edge of positioning table 12.

Head track 30X and head track 30Y each may extend the entire lengths of side walls 32X and 32Y, respectively, and will generally have lengths at least equal to or greater than the lengths of X-axis encoder scale 24XC and Y-axis encoder scale 24YC, respectively. It should be noted, however, that the lengths of the head tracks 30X and 30Y may not be co-linear with the lengths of encoder scales 24XC and 24YC, but will typically overlap at least a part of the lengths of encoder scales 24XC and 24YC. It must also be noted that, in certain embodiments and as discussed in the following, head tracks 30X and 30Y need not be parallel with or perpendicular to their respective X and Y axes.

X-axis read mechanism 24XR and Y-axis read mechanism 24YR each further include a pair of guide rails 34, respectively designated as guide rails 34X and 34Y, that are located on either longitudinal side of the corresponding encoder scale 24XC or 24YC with which the read head 26X or 26Y is associated. Stated another way, in each instance the guide rails 34X and 34Y extend parallel to and on each side of the corresponding encoder scale 24XC or 24YC with which the read head 26X or 26Y is associated and perpendicular to the head track 30X or 30Y with which the read head 26X or 26Y is associated.

As illustrated, each pair of guide rails 34X and 34Y is attached to or otherwise associated with the associated slide member 28X or 28Y upon which the read head 26X or 26Y is mounted. Each pair of guide rails 34X and 34Y will extend downwards from coordinate read plane 12RP and the corresponding slide member 28X or 28Y towards coordinate reference plane 18. In addition, each pair of guide rails 34X and 34Y will effectively enclose the corresponding encoder scale 24XC or 24YC between a corresponding parallel pair of guide rails 3X or 34Y, but will preferably not contacting coordinate reference plane 18.

As a consequence, and as described in further detail below, each pair of guide rails 34X and 34Y will thereby interact with the associated encoder scale 24XC or 24YC to constrain the guide rails 34X and 34Y and thus the slide member 28X or 28Y and read head 26X or 28Y to a region centered over the longitudinal axis of the associated encoder scale 24XC or 24YC as the positioning table 12 moves with respect to the coordinate reference plane 18.

For example, and considering only the X-axis for reasons of simplicity and clarity, if the positioning table 12 is moved along Y-axis 12Y, that is, perpendicular to X-axis encoder scale 24XC, the mechanical interaction between guide rails 34X and X-axis encoder scale 24XC will indicate when read head 26X is no longer in the region centered over the longitudinal axis of the X-axis encoder scale 24XC, and will indicate the direction of motion of positioning table 12 along Y-axis 12Y. Because the X-axis slide member 28X and the associated guide rails 34X are able to move freely along X-axis head track 30X, the mechanical interaction of guide rails 34X with X-axis encoder scale 24XC will move X-axis slide member 28X with its attached X-axis read head 26X and guide rails 34X along the X-axis head track 30X so that the X-axis slide member 28X and attached read head 26X remain in the region centered on the longitudinal axis of X-axis encoder scale 24XC. The same operation will occur with respect to Y-axis read head 26Y and slide member 28Y in the case of motion of positioning table 12 along the X-axis 12X, and with respect to slide members 28X and 28Y and their attached read heads 26X and 26Y for any combination of motion along both X-axis 12X and Y-axis 12Y.

In summary as regards the operation of X-axis coordinate mechanism 20X and Y-axis coordinate mechanism 20Y, therefore, guide rails 34X or 34Y will interact with the corresponding encoder scale 24XC or 24YC to move the associated slide member 28X or 28Y along the corresponding head track 30X or 30Y as positioning table 12 and thus coordinate read plane 12RP moves with respect to coordinate reference plane 18. The interaction of guide rails 34X and 345Y will interact with the respective encoder scale 24XC or 24YC to constrain the corresponding read head 26X or 26Y to be aligned along the longitudinal axis of the corresponding encoder scale 24XC or 24YC and in regions centered on the corresponding encoder scale 24XC or 24YC.

It will be understood that the centering of read heads 26X and 26Y over their respective encoder scales 24XC and 24YC will be performed with respect to both axes of the positioning table 12 and coordinate reference plane 18. It will also be understood that the centering of read heads 26X and 26Y may be performed in multiple steps wherein, in each step, computer 14 will sense the position of read heads 26X and 26Y with respect to the axes of encoder scales 24XC and 24YC through the interaction of guide rails 34X and 34Y with encoder scales 24XC and 24YC. In each step, computer 14 may, if necessary, direct positioning device 12XY to adjust the position of positioning table 12 to achieve the desired centering of read heads 26X and 26Y on encoder scales 24XC and 24YC.

Once read heads 26X and 26Y have been satisfactorily centered on encoder scales 24XC and 24YC, computer 14 may employ read heads 26X and 26Y to read the new location of the positioning table 12 and thus the new location of the point 22P in X/Y coordinates with respect to the X-axis and Y-axis encoder scales 24XC and 24YC. The detected X axis and Y axis values are sent to the computer 14 which, in turn, then determines the precise amount of movement of the positioning table 12 along the X axis and/or Y axis relative to the coordinate reference plane 18 based upon the newly detected and received X-axis and Y axis position values. The computer 14 can then control the movement of positioning table 12 as necessary, to precisely locate the positioning table 12 at its desired new location. Computer 14 may then again compare the actual new positional coordinates of positioning table 12 with the desired new positional coordinates and may direct positioning device 12XY to adjust the position of positioning table 12 to the desired position, again determining any error in the new actual position of positioning table 12 with respect to the desired position and issuing further corrections until the desired position is reached, at least within allowable tolerances.

C. Illustrative Embodiment of the Present Invention in the X/Y/Z Planes

The principles of the present invention may be extended from two dimensional space, as in the exemplary embodiment described above with reference to FIGS. 2 and 3, and into three dimensions for applications requiring positioning and position measurement in three dimensions. The following will illustrate the principles of the present invention as extended into three dimensional space employing the same essential embodiment as discussed herein above with respect to a two dimensional implementation. Again, it must be recognized that the elements of the present invention may be implemented in many forms, certain of which will be discussed after the following discussion of the principles of the present invention as implemented in three dimensional space.

Figure 4:
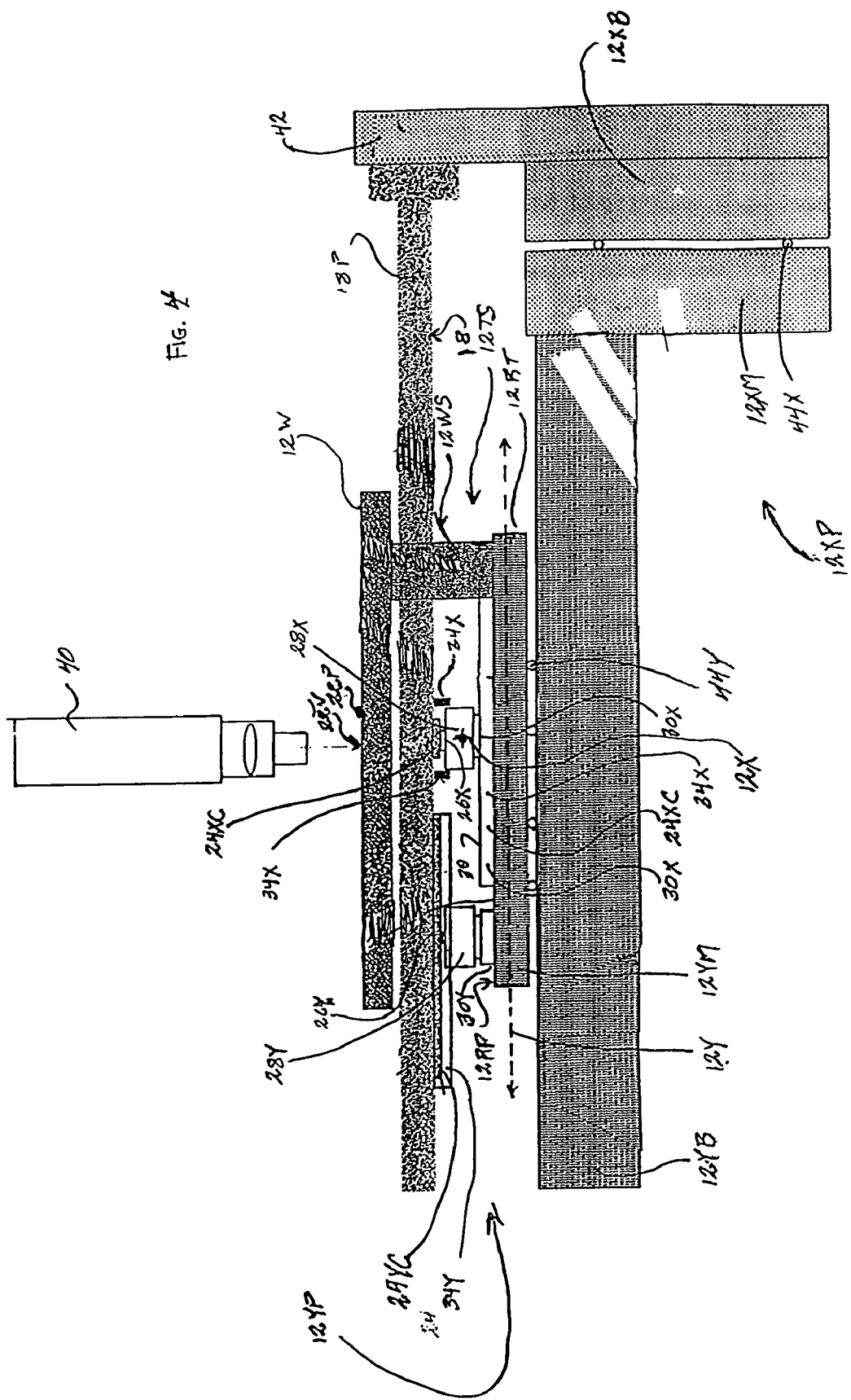
FIG. 4 is a diagrammatic cross sectional view showing an alternate embodiment of a two dimensional system.

FIG. 4 is a diagrammatic representation of a positioning system 10B in which a microscope 40 is arranged to view an object or item supported by or attached to the moveable positioning table 12. In general, such a system may employ the positioning system 10B to move the object or item directly to a position relative to the sight line of the microscope 40 so that various areas or features of the object or item can be readily perceived by the microscope 100. In other implementations, an initial coarse positioning mechanism, such as a manual system or a simple mechanical system may be used to move the object or item to an initial position relative to the line of sight of the microscope 40, whereupon the positioning system 10B is used to adjust the fine position of the object or item so that various areas or features of the object or item can be readily perceived by the microscope 40.

In this exemplary embodiment, the positioning system 10B includes a common base 42 which supports a reference plate 18P with a coordinate reference plane 18 and a table structure 12TS analogous to the positioning table 12 of the above described embodiment. In a typical embodiment, the common base 42 also supports microscope 40 or some other tool or device occupying the location of microscope 40, thereby providing a stable and fixed X- and Y-axes 12X and 12Y locations and orientations of microscope 40 and the axis of microscope 40, and of a viewing point 22V of the microscope 40, or other tool or device.

As shown, table structure 12TS includes a coordinate read positioning table 12RT with a coordinate read plane 12RP and a workpiece positioning table 12W upon which an object or workpiece that is to be observed through microscope 40 is mounted. Workpiece positioning table 12W is supported to be spaced apart but adjacent to and parallel to coordinate read table 12R by a work table support 12WS, so that work piece positioning table 12W will be positioned in coordination with and parallel to coordinate read plane 12RP.

As also shown, reference plate 18P with coordinate reference plane 18 is positioned between workpiece positioning table 12W and coordinate read plane 12RP so that coordinate reference plane 18 and coordinate read plane 12RP are again mutually parallel to one another in an opposing facing relationship and spaced relatively closely together to reduce the sight line distance between coordinate reference plane 18 and coordinate read plane 12RP.

It will also be noted, however, that in this embodiment the positions of coordinate read plane 12RP and coordinate reference plane 18 are reversed with respect to the overall structure of the system 10A as described in FIGS. 2 and 3. It will be appreciated, however, that the reversal of the positions of coordinate reference plane 18 and coordinate read plane 12RP does not alter the functional relationship of these elements or their associated elements, and does not change the principles of operation of the system of the present invention. The relationship illustrated in FIG. 4 does, however, allow the use of a workpiece positioning table 12W that is displaced in space from the position of work table 12 as illustrated in FIGS. 2 and 3, which is advantageous in certain applications, such as is described herein with reference to FIG. 4.

Returning to the description of the embodiment of the present invention in a system 10B, and as illustrated in FIG. 4, coordinate reference plane 18 extends normal to common base 42 and, as with the previous embodiment, supports the X-axis encoder scale 24XC and the Y-axis encoder scale 24YC, which are preferably aligned normal to one another, although this is not required. Coordinate read plane 12RP in turn, and as in the previously described embodiment, supports X- and Y-axis read mechanisms 24XR and 24YR, each of which includes, as described above, a slide member 28X or 28Y, a read head 26X or 26Y, a head track 30X or 30Y, guide rails 34X or 34Y, and, if used in the implementation, guide rail sensors 36X or 36Y.

It will be noted that in the embodiment of a system 10B as illustrated in FIG. 4, guide rails 34X and 34Y are not connected to slide members 28X and 28Y as in system 10A as illustrated in FIGS. 2 and 3. Remembering that in system 10B the positions of coordinate reference plane 18 and coordinate read plane 12RP are reversed, it will be seen that guide rails 34X and 34Y are instead connected or mounted to reference plane 18 and run along either side of encoder scales 24XC and 24YC rather than being connected or mounted to slide members 28X and 28Y. It will also be seen from FIG. 4, however, that in this embodiment guide rails 34X and 34Y engage slide members 28X and 28Y to constrain the movement of slide members 28X and 28Y transverse to the axes of encoder scales 24XC and 24YC due to relative movement of workpiece positioning table 12W and reference plate 18P. Guide rails 34X and 34Y therefore again constrain slide members 28X and 28Y and thus read heads 26X and 26Y to a region centered over the longitudinal axes of encoder scales 24XC and 24YC.

A comparison of the embodiments of X- and Y-axis read mechanisms 24XR and 24YR as implemented in systems 10A and 10B will therefore illustrate the fundamental structural and functional principles of guide rails 34X and 34Y in X- and Y-axis read mechanisms 24XR and 24YR. That is, and in particular with respect to the function of guide rails 34X and 34Y, the purpose of guide rails 34X and 34Y is to maintain appropriately positions of read heads 26 with respect to encoder scales 24 despite relative motion between workpiece table 12W and reference plane 18. For this purpose, guide rails 34X and 34Y directly or indirectly engage read heads 26X and 26Y, that is, slide members 28X and 28Y, with encoder scales 24XC and 24YC, respectively, so that read heads 26 are:

(a) free to move along the longitudinal axes of their respective encoder scales 24 with relative motion between workpiece positioning table 12W and reference plane 18 along the axes of their corresponding encoder scales, and so that (b) the movement of read heads 26 transverse to the axis of their respective encoder scales 24 with relative motion between workpiece positioning table 12W and reference table 18 transverse to the axes of their corresponding encoder scales is constrained to that read heads 26 remain in a region centered over the longitudinal axes of their respective encoder scales 24.

It will be recognized that any structural arrangement or implementation of guide rails 34 that meets these requirements will fall within the present invention and the above summarized requirements of the present invention. For example, the described implementations of systems 10A and 10B show implementations wherein guide rails 34 are respectively mounted to the slide members 28 and to coordinate reference plane 18 with encoder scales 24. It will also be recognized that while guide rails 34 are implemented as elongated structural members extending along and parallel to encoder scales 34 in systems 10A and 10B, other implementations are possible. For example, in systems 10a and 10B encoder scales 24 are represented as being raised with respect to reference plane 18. In the implementation of system 10A, therefore, where guide rails 34 are affixed to slide members 28 and extend downwards to engage encoder scales 24, the guide rails 34 could be replaced by short guide rails 34, approximately the length of slide members 28, or even posts extending downwards from slide members 28 to engage the sides of encoder scales 24.

In other implementations, encoder scales 24 may be recessed into the surface of reference plane 18, in a manner similar to placing the encoder scales 24 at the bottoms of slots or grooves similar to head tracks 30. In this case, the guide rail 34 elements mounted to the slide members 28, whether elongated rails as shown or, for example, posts or tabs of some sort, may engage the inner walls of the grooves or tracks rather than the outside edges of encoder scales 24 or wall-like guide rails 34. In yet other embodiments wherein encoder scales 24 are recessed into reference plane 18, encoder scales 24 may be bordered by "walls" extending above reference plane 18 and along the length of the encoder scales 24.

Returning now to the operation of a system 10B, X/Y motion of workpiece structure 12WS, including workpiece positioning table 12W and coordinate read plane 12RP, is accomplished by means of an X-axis positioning mechanism 12XP and a Y-axis positioning mechanism 12YP. As shown, X-axis positioning mechanism 12XP includes an X-axis base element 12XB and an X-axis positional element 12XM with a bearing mechanism 44X interposed there between to allow free movement of X-axis positional element 12XM with respect to X-axis base element 12XB. The motion and positioning of X-axis positional element 12XM may be driven by, for example, a motor and drive train as described previously or by manual means, such as a micro-screw mechanism as used in a conventional microscope table, but adapted for the present purposes.

Y-axis positioning mechanism 12YP, in turn, includes a Y-axis base element 12YB and coordinate read positioning table 12RT wherein Y-axis base element 12YB is fixed to and extends at a right angle from X-axis positional element 12XM. Coordinate read positioning table 12RT is in turn supported with respect to Y-axis base element 12YB by means of a bearing mechanism 44Y interposed there between to allow free movement of work table structure 12TS with respect to the Y-axis. Again, the motion and positioning of coordinate read positioning table 12RT with respect to the Y-axis may be driven by, for example, a motor and drive train as described previously or by manual means, such as a micro-screw mechanism as used in a conventional microscope table, but adapted for the present purposes.

In summary, therefore, X-axis positioning mechanism 12XP thereby moves and positions X-axis positional element 12XM and the attached Y-axis base element 12YB along the X-axis 12X wherein, for this purpose, the Y-axis base structure 12YB includes table structure 12TS which is mounted on the Y-axis base element 12YB through bearing mechanism 44Y. The Y-axis positioning mechanism 12YP in turn moves and positions table structure 12TS, including coordinate read positioning table 12RT, work table support 12WS and workpiece 12W, along the Y-axis 12Y with respect to Y-axis base element 12YB. Together, therefore, X-axis positioning mechanism 12XP and a Y-axis positioning mechanism 12YP move and position table structure 12TS along X-axis 12X and Y-axis 12Y independently.

It will be apparent from the above descriptions that X-axis positioning mechanism 12XP and Y-axis positioning mechanism 12YP are capable of operating concurrently and in cooperation as in the instance of the system 10A described herein above. It will also be apparent, however, that X-axis positioning mechanism 12XP and a Y-axis positioning mechanism 12YP are equally capable of operating independently so that, for example, workpiece positioning table 12W can be positioned at the desired location along X-axis 12X and then independently positioned at the desired location along Y-axis 12Y, thereby potentially increasing the accuracy and ease of operation of the system.

It should also be noted that use of the above described positioning system 10B will typically begin with mounting an object to workpiece positioning table 12W, and then zeroing the X/Y position of the object or a known point on the workpiece table to provide a known starting location relative to the coordinate reference grid represented by encoder scales 24XC and 24YC. As such, it will be appreciated that the absolute positioning accuracy of the system is not a factor in the accuracy of operation of the system, so that actual precision construction is essentially only required as regards coordinate reference plane 18, encoder scales 24XC and 24YC mounted thereon, and, to a lesser extent, the linearity, tolerances and accuracy of head tracks 30X and 30Y.

It is also to be appreciated that although this embodiment discloses a microscope 40 utilized for inspecting or viewing an object carried by the workpiece positioning table 12W, a variety of other apparatuses, mechanisms, machines and/or devices can be substituted in place thereof. For example, the microscope 40 may be replaced with a welding device to facilitate welding of the desired areas of the object supported by the workpiece positioning table 12W. Alternatively, if the workpiece positioning table 12W4 can move the object relative to an apparatus which removes various items from the object as the object is moved relative to the removal apparatus. It is to be appreciated that application of the positioning system, according to the present invention, is virtually endless as will be readily apparent to those skilled in the art.

It should also be recognized, and particular in instances such as the welding or laser or mechanical machining of objects, or any other operation on objects requiring the use of abrasive, dirty or corrosive agents or tools, the sheltering of the essential position measuring elements beneath workpiece positioning table 12W will provide valuable protection for these elements.

Also, and as discussed above, it should be recognized that any minor faults of the workpiece positioning table 12W or table structure 12TS may be ignored, such as non-orthogonality, loss motion, path wobble, and so on, as orthogonality and path wobble are dictated by the accuracy, linearity and tolerances of read head tracks 30X and 30Y, thereby eliminating loss motion due to stage/driver/manipulator irregularities. Also, error factors due to slight rotation of the work supported by the workpiece positioning table 12W resulting from manipulation irregularities typically amount to no more than the cosine of the angle at that rotation. For example, if the rotational error is 0.005 to 0.01 degrees, the error equals dimension $x^{-8}$, or 32 billionth of an inch error when moving a workpiece positioning table 12W over a range of movement of about 3 inches.

Deviation produced by stage irregularities resulting in rotation of the workpiece about the axis of the plane of drawings are also eliminated by keeping the workpiece positioning table 12W as close as possible to coordinate reference plane 18, which carriers encoder scales 24XC and 24YC.

Figure 5:
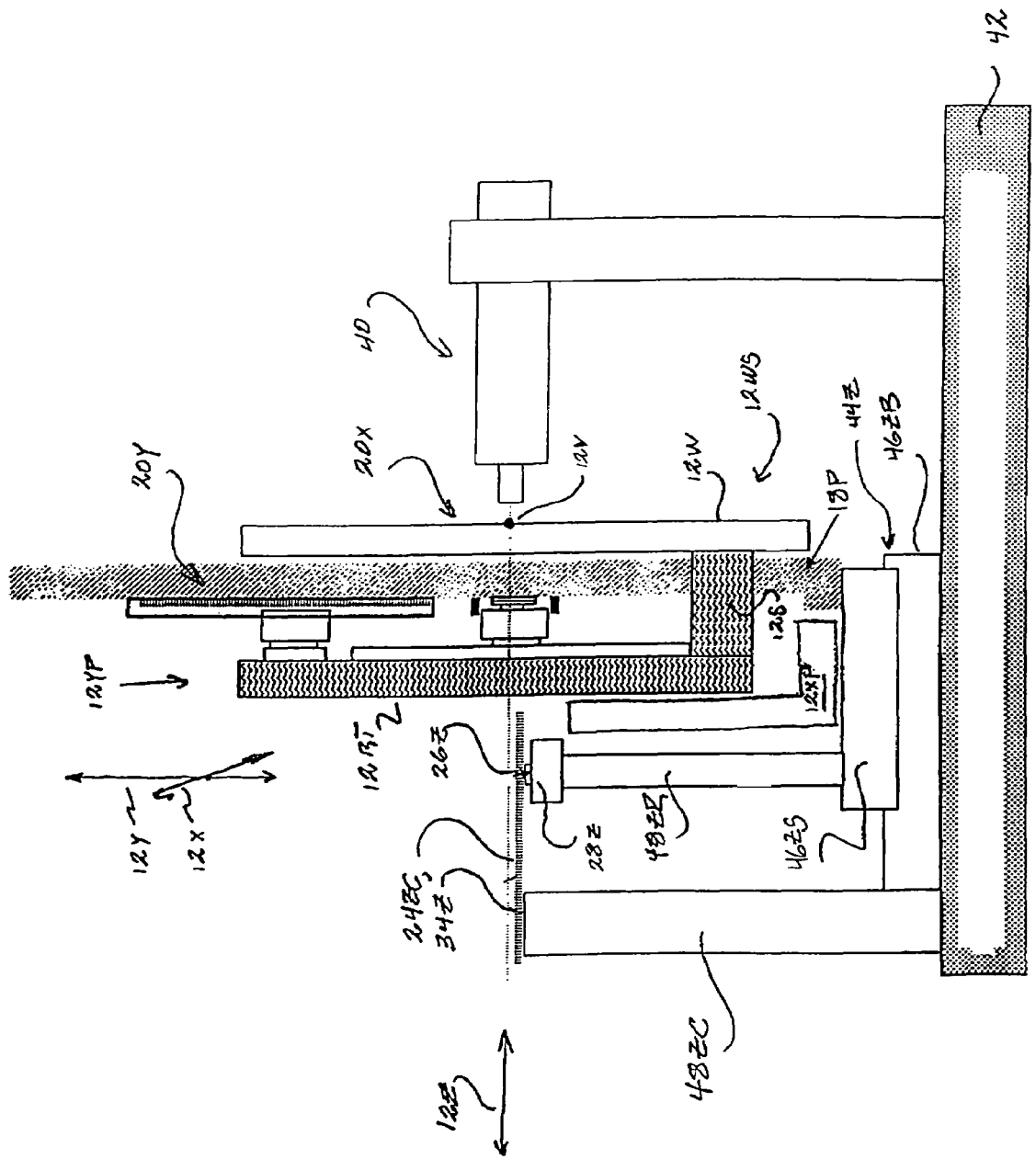
FIG. 5 is a diagrammatic cross sectional and plan view of a three dimensional implementation of the present invention.

Next, it will be recognized that for some applications it is also desirable or necessary to control movement of the position system along a Z-axis, that is, to control movement of a common base to and fro along the viewing axis of the microscope to change the viewing position of the microscope relative to the workpiece and facilitate focusing thereof. An embodiment of the present invention providing for controlled movement along the Z-axis, as well as the X- and Y-axes, is illustrated in FIG. 5 as a positioning system 10C. It will be recognized, however, that system 10C has many structural and operational features in common with the embodiments illustrated in systems 10A and 10B and, as such, those common aspects of the systems will not be discussed in detail and the following descriptions will instead focus upon the particular structural and operational aspects pertaining to providing controlled movement along the Z-axis.

Referring to FIG. 5, and first considering the essential requirements of a system 10C, it may be assumed that the system 10C is required to determine the position of a point 22P on a positioning table 12, such as on the workpiece positioning table 12W of the above described system 10B, but along the X-, Y- and Z-axes rather than just the X- and Y-axis. It may also be assumed, as illustrated in FIGS. 4 and 5, that the system 10C will include a reference plate 18P with a coordinate reference plane 18, a table structure 12TS with a coordinate read positioning table 12RT with a coordinate read plane 12RP, X- and Y-coordinate mechanisms 20X and 20Y including X- and Y-encoder scales 24XC and 24YC on the coordinate reference plane 18 and X- and Y-read mechanisms 24XR and 24YR on the coordinate read plane 12RP. It may also be assumed that the table structure 12TS will include a workpiece positioning table 12W connected to the coordinate read positioning table 12RT by a work table support 12WS, and X- and Y-positioning mechanisms 12XP and 12YP, or their structural and functional equivalents. It may also be reasonably assumed that the surface of workpiece positioning table 12W to which the object or workpiece of interest is mounted is effectively optically flat and is effectively parallel with coordinate read plane 12RP, or at least that any errors or irregularities are known, repeatable and mappable.

As also illustrated in FIG. 5, however, system 10C will include a Z-axis manipulation device, such as a drive motor 12MC and a drive train 12TC, and will include a Z-axis coordinate mechanism 20Z that includes a Z-axis encoder scale 24ZC and a Z-axis read mechanism 24ZR.

Considering the general operation of a system 10C as illustrated in FIG. 5, and referring to the systems 10A and 10B described herein above, will show that, again, X-axis coordinate mechanism 20X and a Y-axis coordinate mechanism 20Y respectively function to determine the X-axis and Y-axis coordinate position 22 of a point 22P on the work plane 12W comprising the "front" surface of positioning table 12, and thus of a workpiece fastened to work plane 12W. X-axis coordinate mechanism 20X and Y-axis coordinate mechanism 20Y may thereby operate with the X- and Y-manipulator mechanisms, such as positioning device 12XY, to determine the location of point 22P by moving positioning table 12 so that point 22P is located at a viewing point 22V, which is typically at the origin point of the X/Y coordinate reference grid defined by X-axis coordinate mechanism 20X and Y-axis coordinate mechanism 20Y, as will be discussed in detail below. The X/Y coordinates of the point 22P may then be determined by reading the X- and Y-offsets or displacements required to move the point 22P to the viewing point 22V from the X-axis coordinate mechanism 20X and a Y-axis coordinate mechanism 20Y. Viewed in another way, X- and Y-axis coordinate mechanisms 20X and 20Y and the X- and Y-manipulator mechanisms may be used to move a selected point 22P on positioning table 12 or on an object mounted onto positioning table 12P to the viewing point 22V, which may be the focus or operating point of, for example, a microscope or a tool, such as a laser machining device or a mechanical machining device. It will therefore be recognized that in systems 10A, 10B and 10C, the point 22P may be found anywhere within the range of motion of the positioning table 12 or table structure 12TS, which includes anywhere in the X/Y coordinate reference grid defined by encoder scales 24XC and 24YC.

As discussed with regard to systems 10A and 10B, however, X-axis coordinate mechanism 20X and a Y-axis coordinate mechanism 20Y respectively function to determine the X-axis and Y-axis coordinate position 22 of a point 22P on the work plane 12W comprising the "front" surface of positioning table 12, and thus of a workpiece fastened to work plane 12W. X-axis coordinate mechanism 20X and a Y-axis coordinate mechanism 20Y may thereby operate with the X- and Y-manipulator mechanisms, such as positioning device 12XY, to determine the location of point 22P by moving positioning table 12W so that point 22P is located at a viewing point 22V, which is typically at the origin point of the X/Y coordinate reference grid defined by X-axis coordinate mechanism 20X and Y-axis coordinate mechanism 20Y, as will be discussed in detail below. The X/Y coordinates of the point 22P may then be determined by reading the X- and Y-offsets or displacements required to move the point 22P to the viewing point 22V from the X-axis coordinate mechanism 20X and a Y-axis coordinate mechanism 20Y. Viewed in another way, X- and Y-axis coordinate mechanisms 20X and 20Y and the X- and Y-manipulator mechanisms may be used to move a selected point 22P on positioning table 12W or on an object mounted onto positioning table 12W to the viewing point 12V, which may be the focus or operating point of, for example, a microscope or a tool, such as a laser machining device or a mechanical machining device.

As such, it will be apparent that the accuracy with which the Z-axis locations of points 22P and 22V in both system 10B and system 10C is of critical significance only when the X- and Y-axes locations of point 22P is in close proximity to point 12V. It will also be apparent that when the location of point 12P along X-axis 12X, Y-axis 12Y and a Z-axis 12Z is proximate to the X-, Y- and Z-axes locations of point 12V, the measurements of the Z-axis 12Z of point 22P may be used to adjust or correct the locations of point 22P along the X- and Y-axes 12X and 12Y, and the locations of point 22P along the X- and Y-axes 12X and 12Y may be used to adjust or correct the locations of point 22P along the Z-axis 12Z.

For these reasons, and according to the present invention, therefore, it is desirable to have a Z-axis coordinate mechanism 20Z that is primarily structured to most accurately determine a Z-axis 20Z location of the point 20P when point 22P is in the proximate region of point 22V. As a consequence, and again according to the present invention, it is thereby preferable that the Z-axis encoder scale 24ZC is substantially normal to and in the plane of the intersection of X- and Y-axes encoder scales 24XC and 24YC and lies along or nearly along the axis of microscope 40, and thus through the point 22V.

It must also be noted that, since in system 10C the table structure 12TS 12S is moveable along the Z-axis 12Z, the Z-axis encoder scale 24ZC and Z-axis read mechanism 24ZR must be located with respect to the table structure 12TS and other elements of the X-axis coordinate mechanism 20X and a Y-axis coordinate mechanism 20Y to avoid mechanical interference, which usually requires that the Z-axis 12Z mechanisms be spaced apart from the X- and Y-axis mechanisms along the Z-axis 12Z.

In addition, it is often preferable that the Z-axis read mechanism 24ZR be dynamically aligned with the Z-axis encoder scale 24ZC by a mechanism including a Z-axis slide member 28Z, Z-axis head track 30Z and guide rails 34Z, as described with regard to the X- and Y-axis read mechanisms 24XR and 24YR, and for the same reasons.

In a presently preferred embodiment of the invention as illustrated in FIG. 5, therefore, table structure 12WS with X- and Y-coordinate mechanisms 20X and 20Y, the x/y manipulation mechanisms and reference plate 18P are mounted upon a Z-axis positioning mechanism 12ZP. The Z-axis positioning mechanism 12ZP, a Z-axis coordinate mechanism 20Z and the microscope 40 are in turn mounted to the common base 42. As such, the Z-axis positioning mechanism 12ZP with Z-axis coordinate mechanism have been effectively interposed between the mechanisms and structures of system 10B and common base 42, thereby allowing positioning and location of the system 10B mechanisms and structures with respect to the Z-axis 12Z.

The basic elements added to the system 10B to provide the three axis system 10C may therefore be seen to include a Z-axis base 46ZB that is mounted to common base 42 and that supports a Z-axis bearing mechanism 44Z that in turn supports a Z-axis slide 46ZS so that Z-axis slide 46ZS can move freely along Z-axis 12Z. Z-axis slide 46ZS in turn supports a Z-axis read head 26Z that may be supported on a Z-axis slide member 28A that is interposed between the Z-axis read head 26Z and Z-axis slide 46ZS to allow positional adjustment of the Z-axis read head 26Z to a preferred position aligned on the longitudinal axis of Z-axis encoder scale 24ZC, as has been described previously with regard to X-axis and Y-axis coordinate mechanisms 20X and 20Y. As indicated, the Z-axis read head a Z-axis read head support 48ZR may be interposed between Z-axis slide 46ZS and the Z-axis read head 26Z and associated elements to position Z-axis read head 26Z at Z-axis 12Z. In a like manner, Z-axis encoder scale 24ZC will typically be mounted on a Z-axis encoder scale support 48ZC to support the Z-axis encoder scale 24ZC in alignment with Z-axis 12Z and the viewing axis of microscope 40 or any other tool in the place of microscope 40.

It will be apparent that in the instance of Z-axis encoder scale 24Z the Z-axis encoder scale 24Z is mounted directly or indirectly to common support 42, so that the Z-axis encoder scale 24Z is fixed in position along Z-axis 12Z. Z-axis read head 26Z, however, moves along the Z-axis with Z-axis slide 46ZS and thus with table structure 12TS and the associated with X- and Y-coordinate measuring mechanisms. As such, the position of table structure 12TS and thus point 22P along the Z-axis may be read from Z-axis encoder scale 24Z be the Z-axis read head 26Z.

It will also be understood that, as shown in FIG. 5, the Z-axis encoder scale 24Z and the Z-axis read head 26Z and their associated structures and mechanisms are spaced apart from table structure 12TS and the associated X/Y positioning mechanisms by a distance along the Z-axis 12Z that is sufficient to avoid mechanical interference between the parts.

It will be further appreciated that the position of table structure 12TS and the associated X/Y position adjustment and measuring mechanisms may be adjusted and controlled by other methods, depending upon the requirements of the specific system 10C. For example, accurately positioned along a Z-axis 12Z by means of accurately dimensioned spacer blocks interposed between, for example, a Z-axis slide 46ZS mechanism and a reference point or edge on common base 42. In another embodiment, the position of the surface of workpiece positioning table 12W to which an object is mounted may be adjusted by interposing spacer plates or blocks of known thicknesses between the top of workpiece positioning table 12W and the object, thereby essentially providing a new workpiece positioning table 12W surface spaced apart from the basic table surface by that distance, and so on.

D. Summary Of The Exemplary Embodiment

Having described an exemplary embodiment of the present invention for two and three dimensional spaces, the following will summarize certain basic principles of the present invention as illustrated by the above described embodiment, and will then describe certain alternate embodiments of the invention in view of the exemplary two and three dimensional space embodiments described herein above.

First, it has be described herein above that one disadvantage and problem of positioning systems of the prior art is that the position measurement coordinate grid is neither stable nor repeatable. That is, the measurement scales in prior art systems are typically mounted on the table, which is a moving platform that is typically subject to distortion due to temperature and mechanical stress as well as rotational skewing and misalignment and striction induced errors. In contrast, and according to the present invention, the position measurement coordinate grid, that is, the X and Y axis measurement encoding scales, are mounted on or in the reference surface, which is stable, repeatable and non-moving, so that all position measurements are taken relative to a stable coordinate grid.

In addition, the placement of the coordinate reference grid on the stable reference surface allows the coordinate reading mechanisms, that is, coordinate mechanisms 20X and 20Y, to be placed significantly closer to the coordinate grid embodied in encoder scales 24XC and 24YC. This, in turn, significantly reduces the line of sight distance between the coordinate reading mechanisms and the encoder scales, thereby significantly reducing any linear errors resulting from angular errors in the orientation or positioning of the moving elements, that is, the coordinate reading mechanisms.

The mounting of the encoder scales 24XC and 24YC on coordinate reference plane 18 and the coordinate reading mechanisms, that is, read heads 26X and 26Y and the associated structures, on the opposingly facing coordinate read plane 12RP of the table further significantly reduces the line of sight distance between the coordinate reading mechanisms and the encoder scales. Again, this reduction in the line of sight distance for reading the encoded coordinates significantly further reduces errors resulting from angular or rotational errors in the orientation or positioning of the coordinate reading mechanisms.

In yet another aspect of the present invention, the coordinate reading mechanisms including read heads 26X and 26Y, whose function is to read the table coordinate position with respect to the coordinate reference grid embodied in encoder scales 24XC and 24YC, are movable in coordination with the respective transverse motions of the table relative to each of the encoder scales. As a result, read heads 26X and 26Y are maintained in positions that are always within no more than a short distance of being aligned with the longitudinal axes of their respective encoder scales 24XC and 24YC. Again, this reduction in the line of sight distance for reading the encoded coordinates significantly further reduces errors resulting from angular or rotational errors in the orientation or positioning of the coordinate reading mechanisms.

Further in this regard, the mechanisms for aligning read heads 26X and 26Y with the longitudinal axes of their respective encoder scales 24XC and 24YC with motion of the positioning table 12, that is, slide members 28X and 28Y riding in head tracks 30X and 30Y and positioned centered on encoder scales 24XC and 24YC by guide rails 34X and 34Y, or their functional equivalent, are mounted on or entirely associated with the positioning table 12 and, in particular, coordinate read plane 12RP. Because of the association of the coordinate reading mechanisms, that is, the slide members, read heads, and head tracks, with coordinate read plane 12RP, it will be apparent that these mechanisms will reflect and be influenced by angular or rotational errors in the orientation or positioning of the positioning table 12 and coordinate read plane 12RP.

As described, however, the positioning coordinate grid embodied in encoder scales 24XC and 24YC mounted in or to the stable coordinate reference plane 18 and is thereby stable and effectively absolute as it is not effected or influenced by angular or rotational errors in the orientation or positioning of the positioning table 12 and coordinate read plane 12RP. As a result, the automatic centering of read heads 26X and 26Y on the longitudinal centerlines of encoder scales 24XC and 24YC by guide rails 34X and 34Y, or their functional equivalent, during motion of positioning table 12, however, read heads 26X and 26Y are realigned with the absolute coordinate grid represented by encoder scales 24XC and 24YC at each motion of the positioning table 12. As a result, the coordinate mechanisms 20X and 20Y further reduce errors due to angular or rotational errors in the orientation or positioning of the positioning table 12 and coordinate read plane 12RP, and thus of the coordinate reading mechanisms including read heads 26X and 26Y, by realigning the coordinate reading mechanisms with the absolute coordinate reference grid embodied in encoder scales 24XC and 24YC upon each motion of the positioning table 12 and coordinate read plane 12RP.

Also, it should be recognized that any minor faults or errors in the positioning table 12 or any structures associated therewith may be effectively ignored, such as non-orthogonality, loss motion, path wobble, and so on, as orthogonality and path wobble are dictated by the accuracy, linearity and tolerances of read head tracks 30X and 30Y, thereby eliminating loss motion due to stage/driver/manipulator irregularities. Also, error factors due to slight rotation of the object supported by the positioning table 12 resulting from manipulation irregularities typically amount to no more than the cosine of the angle at that rotation. For example, if the rotational error is 0.005 to 0.01 degrees, the error equals dimension $x^{-8}$, or 32 billionth of an inch error when moving a workpiece positioning table 12W over a range of movement of about 3 inches.

Deviation produced by stage irregularities resulting in rotation of the workpiece about the axis of the plane of drawings are also eliminated by keeping the positioning table 12 as close as possible to coordinate reference plane 18, which carriers encoder scales 24XC and 24YC.

In brief, therefore, the accuracy of a system 10A is largely determined by the precision and stability of the coordinate reference grid embodied in encoder scales 24XC and 24YC and, to a lesser extent, by the accuracy and linearity of head tracks 30X and 30Y. The construction of stable, accurate encoder scales 24XC and 24YC and the mounting of these elements in a stable, accurate coordinate reference plane 18 is, however, well understood in the arts and is readily and commonly achievable. In a like manner, the degree of accuracy, linearity and tolerances desired for head tracks 30X and 30Y and slide members 28X and 28Y is also well understood in the arts and is readily and commonly achievable, and is largely self correcting in operation due to the above described structure and operation of the present invention. Also, many of the errors or unwanted tolerances in encoder scales 24XC and 24YC and in head tracks 30X and 30Y are repeatable errors or tolerances and are thus readily correctable in use. It will also be recognized that the most critical elements, that is, coordinate reference plane 18 and encoder scales 24XC and 24YC are separated from the remainder of the system and are thereby protected from the stresses and abuses and wear of the intended use.

E. Considerations of Further and Alternate Embodiments

It will be apparent from the above summary of the basic principles and aspects of the positioning system of the present invention that there is a wide range of possible alternate embodiments of the present invention that conform to these basic principles and that will extend far beyond the aspects and features of the exemplary two and three dimensional systems described herein above.

For example, it will be apparent that the roles of the coordinate reference plane and the coordinate read plane may be reversed in certain implementations, that is, that the coordinate plane may be formed in the work table with the reference plane assuming the place and functions of the coordinate plane in the above described exemplary embodiment.

It may also be seen that the roles of the coordinate reference and coordinate read planes may also be reversed in another manner. That is, there is a implicit assumption in the above descriptions of exemplary systems that the one plane is fixed in space and that the other plane is movable in space. Further consideration, however, will show that the significant aspect of the present invention is this regard is not whether one plane is fixed and the other moveable, but the relative motion and positions of the planes. As such, it is readily possible to implement a system of the present invention wherein, for example, the planes that are fixed and moveable are reversed or wherein both planes are moveable with respect to each other and to their surrounding space.

It may also be seen that either or both of the coordinate reference and coordinate read planes need not be implemented as or on a physical object, such as the work table. For example, either or both of the reference and coordinate planes may be implemented in a plane defined in space that is separate from, for example, a work table or base, so long as they are related or coupled to the plane containing the point whose position is to be determined. For example, either or both of the reference and coordinate planes may be implemented as optically defined planes in space that are spaced apart from, for example, the work table or a base, but that are related and coupled to the work table or base as required by the function of the system.

It must also be recognized that the coordinate scales and axes and read mechanisms described just above may be implemented in alternate was from those described herein above with reference to FIGS. 2 through 4. For example, a coordinate encoder scale need not be physically implemented on the coordinate read plane or coordinate reference plane as a scale along a coordinate axis, but may instead be implemented using optical or acoustic inferometer or rangefinding methods, with corresponding changes in the coordinate read heads and the associated elements, such as the head track and guide rails.

In yet other embodiments, the functions of the coordinate encoder scales and read mechanisms and their associated elements may be implemented with other mechanisms performing the same essential functions. In other embodiments, and for example, the coordinate scale mechanisms and the coordinate read mechanisms of the present invention may be integrated into the mechanisms for positioning the reference plane, or for positioning the reference and coordinate planes relative to one another. That is, and for example and assuming for purposes of discussion that the reference plane is moved and positioned relative to the coordinate plane, the reference plane, or work table, may be position by a rotationally drive rack and pinion mechanism or a rotationally driven lead screw mechanism. As is well known, in this type of drive mechanism the rack or a lead nut are attached to the element to be moved, that is, and for example, to the work table, while the pinion or the lead screw, which are coupled respectively to the rack or the lead nut, are coupled or mounted to the stationary element, such as the element bearing the coordinate plane, and are rotated to move the work table and associated reference plane.

It is apparent that the rack and pinion system may be implemented in a manner similar to that described above with reference to FIGS. 2 through 4, with the rack element being associated with the coordinate plane, the coordinate encoder scale being located along the rack element and the read mechanisms with the head tracks and guide rails being implemented in a manner similar to that described with respect to FIGS. 2 and 3. In other implementations, however, including both the rack and pinion and the lead screw mechanism, the coordinate encode scale mechanisms may be implemented as shaft encoders that are mounted to or are part of the rotational drive mechanisms, with corresponding changes in the read mechanisms. It should be noted that the implementations employing rotational drive mechanisms and shaft encoders will require adaptations in the read mechanisms, which will be associated with the shaft encoders rather than with the reference plane directly. The functions of the track and guide rail elements will likewise require adaptations in that they must provide for controlled motion of the pinion or drive thread or drive nut elements transverse to the coordinate axis, rather than only the read mechanisms.

It should be noted with regard to the above implementations employing, for example, lead screw drives, that the lead screw or remote sensor, that is, a shaft encoder or other remote measurement sensor, can be mounted to or in itself a moving element but can remain referenced to a fixed coordinate system as well. In other words, the lead screw can be anchored to the moving work table, for example, and the coordinate system can be associated with and fixed to the viewing system. Also the linear scales, if used, can be mounted on the work table while the read heads are mounted on a fixed member. It should also be noted that the element holding the metrology/coordinate scales does not in itself need to bear scales or sensors or provide tracks guiding the moving elements.

Figure 6A:
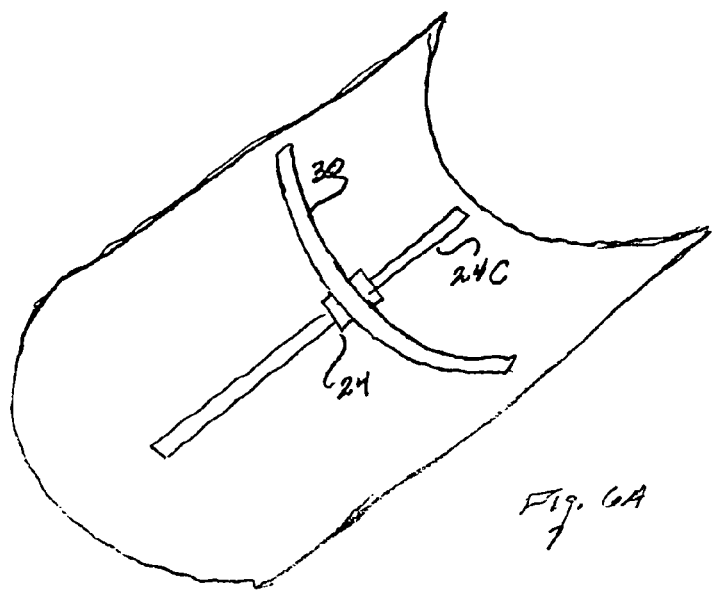
FIGS. 6A-6C are diagrammatic illustrations of alternate arrangements of the coordinate read plane and axes; and, FIGS. 7A-7F illustrate alternate embodiments of an encoder scale and read head of the present invention.
Figure 6B:
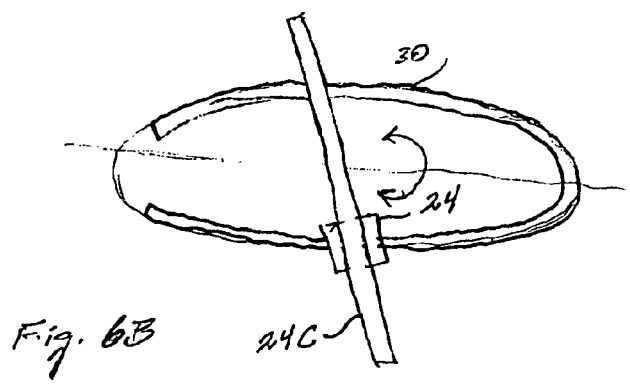
Figure 6C:
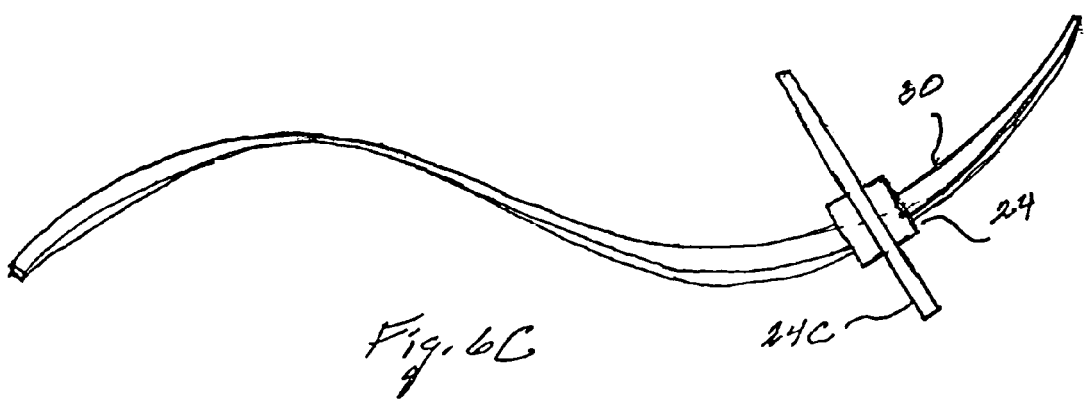

Further in this regard, it will be noted that in the implementations illustrated in FIGS. 2-5 the coordinate and read axes are located within one plane, in the instance of an implementation having two coordinate axes, and in two orthogonal planes in the implementations having three coordinate axes. As illustrated in FIGS. 6A-6C, however, and because the read mechanisms are coupled to the corresponding coordinate axes, both to move along the coordinate axes and to located at a predetermined transverse position with respect to the coordinate axes with movement of the coordinate plane relative to the other coordinate axis, the coordinate axes do not need to be linear or oriented at right angles to one another, but may be, for example, curved or at an angle to one another. In fact, one or both coordinate axes may, for example, form a complete circle or ellipse or other closed shape when, for example, the coordinates of a position are to be determined in cylindrical or polar coordinates. To illustrate, a sundial incorporates a two axis coordinate system wherein one coordinate axis forms a complete 360° circle on the horizontal plane and the other axis forms, typically, a 180° arc in a plane perpendicular to the horizontal plane. This coordinate measuring system may be implemented in the present invention so long as each read head is coupled, by its guide mechanism, to the other coordinate axis such that motion along the other coordinate axis transverse to its own coordinate axis is coupled to the read head to maintain the read head in the appropriate position relative to its own coordinate axis.

Consideration of the present invention as illustrated in FIGS. 2-5 and in FIGS. 6 6A-6C will show, in this regard, that the fundamental requirement with respect to the relationship between the coordinate and read axes is that a coordinate reference plane and the corresponding coordinate read plane be locally generally parallel and orthogonal to one another in each position along the coordinate read axis at each location that the read head can assume along the corresponding coordinate axis. The guide mechanism of the read head can thereby position the read mechanism along another corresponding axis of the coordinate system during motion of the coordinate read plane along an axis transverse to the axis of the coordinate scale. This essentially means that the coordinate read and reference planes form locally parallel planes at each position of the read head along the read axis. Stated another way, and most generally, the "line of sight" between a read head and a corresponding coordinate axis must define a plane that, at each point along the read axis and the corresponding point on the corresponding coordinate axis, is flat along the axis defined by the "line of sight". As such, it will be apparent that the coordinate and read planes may form, for example, parallel cylindrical or spherical planes or wherein the "line of sight" between corresponding points along the read axis and the coordinate axis can form a flat "ribbon" following a path through space which may be straight, angled, curved or "twisted".

In a like manner, the coordinate scale along any coordinate axis need not be linear, but may be, for example, logarithmic, or may follow any other desired scalar system.

In this regard, and as discussed herein above, it is a primary object of the present invention to provide a positioning system providing repeatability in position measurement because any non-linearities, irregularities or errors in measurement may be determined and corrected or compensated for so long as the non-linearities, irregularities or errors in measurement are repeatable from one measurement to another.

Other alternative embodiments of the present invention may be illustrated by reference to the elements of the system 10A illustrated in FIGS. 2 and 3. For example, it will be appreciated that there are a number of methods and mechanisms by which the relative positions of a guide rail 34X or 34Y and a slide member 28X or 28Y with read head 26X or 26Y can be determined and by which the guide rail 34X or 34Y or rails 34X or 34Y, the slide members 28X and 28Y and the read heads 26X and 26Y can interact with an encoder scale 24XC or 24YC to achieve the desired dynamic centering of the read head 26X or 26Y.

For example, it has been assumed in the above descriptions that the relative motion of an encoder scale 24XC or 24YC with respect to a slide member 28X or 28Y due to a motion of positioning table 12 could, in itself and by applying direct physical pressure on a corresponding guide rail 34X or 34Y, provide the motive force to move the guide rail or rails 34X or 34Y and thus the slide members 28X or 28Y to maintain the desired alignment of the reader heads 26X and 26Y with the encoder scales 24XC and 24YC. For example, the system 10A may employ two guide rails 34X or 34Y with each slide member 28X or 28Y wherein the guide rails 34X or 34Y are mechanically biased into low stress and low pressure contact with the sides of encoder scales 24XC and 24YC, such as by springs or magnetic fields. A loss or reduction or an increase of contact pressure between a guide rail 34X or 34Y and an encoder scale 24XC or 24YC, or a differential contact pressure or distance, would then cause movement of either or both of slide members 28X and 28Y in coordination with the movement of positioning table 12 by positioning device 12XY.

Other embodiments could, for example, employ magnetic or capacitive guide rail sensors 36 operating between each the encoder scales 24XC and 24YC and either an associated single guide rail 34X and 34Y or the described double guide rails 34X and 34Y to detect and monitor the distance between the guide rail sensor or sensors 36X and 36Y and the guide rail or rails 34X and 34Y to determine the distance and magnitude of any relative motion due to movement of the positioning table 12 relative to the coordinate reference plane 18. Again, the actual movement of slide members 28X and 28Y along head tracks 30X and 30Y could be driven by mechanical or, for example, electromagnetic or electrostatic, interaction between the guide rail or rails 34X and 34Y and the encoder scales 24XC and 24YC.

In still other embodiments, a magnetic elements, such as a permanent magnet, may be located along one or more sides of an encoder scale 24XC or 24YC and a second magnetic element fixed to the corresponding slide member 28X or 28Y to attract the slide member 28X or 28Y to the corresponding encoder scale 24XC or 24YC, and a low coefficient of friction element interposed between each slide member 28X and 28Y and the corresponding encoder scales 24XC and 24YC. The magnetic elements would then operate to maintain each slide member 28X and 28Y in a closely aligned relationship with the corresponding encoder slide 24XC and 24YC with motion of the positioning table 12 while the low friction elements would all the slide members 28X and 28Y to move freely along the corresponding head tracks 30X and 30Y and corresponding encoder scales 24XC and 24YC. The low friction elements would typically be arranged to maintain a small but frictionless air gap between the magnetic elements and the encoder scales 24XC and 24YC and the head tracks 30X and 30Y.

In yet other embodiments, the guide rail "sliders" or "sensors" could be comprised of optical sensors that would determine the position of the read head to the encoder scales optically, and the read head could be driven by, for example, a motor and drive train or a magnetic element to maintain the desired centering of the read heads with respect to the longitudinal axes of the encoder scales. In this implementation either or both of the encoder scales and the "guide rails" could be formed, for example, of graphic elements printed on a surface. In this implementation, for example, the encoder scale could serve the functions of both the encoder scale and the guide rails, since there is no actual direct physical interaction between the read head and the "guide rail". In addition, the encoder scale or scales need not be located, for example, directly on the positioning or work table, but can be physically separate from those elements of the system, thereby further isolating the measurement mechanisms from the physical positioning mechanisms.

In yet other embodiments, guide rails sensors 36X and 36Y could include driving elements controlled by computer 14, so that the motion of slide members 28X and 28Y along head tracks 30X and 30Y could be driven and controlled independently of or in parallel with the movement of positioning table 12 by positioning device 12XY.

Lastly, it should be noted that the present invention is also able to compensate for various expansion and contraction of materials if the materials are machined, milled, inspected etc. at a temperature other than a selected norm, such as 70F for example. If the encoder scales, for example, are manufactured from the same material as the material of an object attached to positioning table 12 to be machined, milled, and so on, the encoder scales will have identical expansion and contraction characteristics which the objects, which will assist with maintaining the accuracy of the system according to the present invention. Alternatively, it is possible to correct for the expansion and contraction of the materials due to software correction errors, as would be readily apparent to those skilled in the art.

In yet other embodiments, the function of guide rails 34X and 34Y could be performed by guide rail sensors 36 mounted on or otherwise associated with the slide members 28X and 28Y and interacting directly with the encoder scales 24XC and 24YC rather than through guide rails 34X and 34Y. In this embodiment, and in effect, the guide rail sensors 36 themselves act as guide rails 34X and 34Y in detecting the positions of the encoder scales 24XC and 24YC with respect to the slide members 28X and 28Y directly, rather than being mounted on the guide rails 34X and 34Y to detect the positions of the guide rails 34X and 34Y with respect to the encoder scales 24XC and 24YC.

Also, it is to be appreciated that X-head track 30X extending along X-axis 12X and Y-axis head track 30Y extending along Y-axis 12Y can be formed in virtually any sidewalls 32X and 32Y or surface of the positioning table 12. Although it may be desirable for the head tracks 30X and 30Y to extend substantially normal to one another, this is not required. That is, even if the head tracks 30X and 30Y are not arranged precisely normal to one another, the present invention can accommodate virtually any deviation(s) in the relative orientation of the head tracks 30X and 30Y, including non-linearities in head tracks 30X and 30Y. In addition, and although it may be desirable for encoder scales 24XC and 24YC to lie along axes which extend substantially normal to one another, this is not required. That is, even if encoder scales 24XC and 24YC are not arranged precisely normal to one another, the present invention can accommodate for virtually any deviation(s) in the relative orientation of encoder scales 24XC and 24YC, including non-linearities in encoder scales 24XC and 24YC. In this regard, it must be noted that any deviations in orientation or linearity or errors can be corrected so long as the deviations, non-linearities or errors are repeatable because repeatable errors can be detected and measured and error compensation factors can be determined and applied to the system during operation. For example, any deviations, non-linearities or errors in, for example, the X-axis coordinate mechanism 20X or the Y-axis coordinate mechanism 20Y or in both, such as non-orthogonality or non-linearity of either or both of the encoder scales 24XC or 24YC or head tracks 30X or 30Y and so on, can be measured and mapped when the system 10A is assembled and one or more corresponding error maps 38 may be stored in, for example, computer 14 for application and correction during the use of the system 10A.

It will also be understood that read heads 26 and encoder scales 24 may be implemented in a variety of forms other than those described herein above. For example, and referring to FIGS. 7A-6F, FIG. 7A illustrates an implementation of read heads 26/slide members 28 and encoder scales 24 that is similar to those described herein above wherein the encoder scale is fixed and the read head is mounted to a movable member, such as a slide member 28. FIG. 6B, in turn, illustrates an implementation wherein the read head 26 is fixed and the encoder scale 24 is movable, that is, attached to the work positioning table 12W.

FIGS. 7C and 7D illustrate implementations employing a transmitter/receiver measurement system, such as a laser or acoustic measurement system, wherein either the transmitter or the receiver may be fixed to the moveable element, such as work positioning table 12W, and the other to the fixed element, such as reference plate 12R. FIGS. 7E and 7F, in turn, are similar to FIGS. 7C and 7D but employ a combined transmitter/receiver unit that may be attached to the moveable or fixed element while a reflecting element is attached to the other of the moveable and fixed elements.

It is also to be appreciated that although movement of the positioning table 12 is shown as being driven by a motor or a drive of some sort, the positioning table 12 could be also manually moved and, rather than using coordinate reading devices such as reader heads 26X and 26Y, a magnifying glass or some other visual device or aid can be utilized to determine the correct orientation on the table 4 relative to either or both of the X and Y-axis encoder scales 24XC and 24YC, including laser systems and optical inferometer systems.

Lastly, it must be noted that while the exemplary positioning system 10A illustrated and described in association with FIGS. 2 and 3 is a two axis system, that is, operates with respect to an X-axis 12X and a Y-axis 12Y, the basic positioning system of the present invention may be used with other coordinate systems, such as a single axis positioning system having only an X-axis 12X or only a Y-axis 12Y. In other embodiments, which will be discussed further in following descriptions, the positioning system and mechanisms of the present invention may be extended to, for example, three axis systems having X-, Y- and Z-axes, and even systems using entirely different coordinate systems, such as a Cartesian or polar coordinate system.

To reiterate and summarize the above descriptions, therefore, an X-axis coordinate mechanism 20X is comprised of an X-axis encoder scale 24XC, an X-axis slide member 28X, an X-axis read mechanism 24XR and a Y-axis read mechanism 24YR wherein read heads 26X and 26Y of read mechanisms 24XR and 24YR are mounted on corresponding slide members 28X and 28Y, which respectively ride in an X-axis head track 30X and a Y-axis head track 30Y. Head track 30X is located in a sidewall 32X of the positioning table 12 and extends orthogonally to the X-axis encoder scale 24XC while at least one guide rail 34X is associated with the slide member 28X and runs parallel to the X-axis encoder scale 24XC. The Y-axis coordinate mechanism 20Y is comprised of similar elements arranged and operating in a similar manner, and the X-axis coordinate mechanism 20X and Y-axis coordinate mechanism 20Y function in combination to determine the location of the positioning table 12 and thus the location of the point 22P in X/Y coordinates with respect to the X-axis and Y-axis encoder scales 24XC and 24YC.

Also, and as described above, each pair of guide rails 34X and 34Y, or there functional equivalent, interact with the associated encoder scale 24XC or 24YC to keep the guide rails 34X and 34Y and thus the slide member 28X or 28Y with the read head 26X or 28Y mounted thereto centered over the longitudinal axis of the associated encoder scale 24XC or 24YC as the positioning table 12 moves with respect to the coordinate reference plane 18.

Since certain changes may be made in the above described positioning systems without departing from the spirit and scope of the invention herein involved, it is intended that all of the subject matter of the above description or shown in the accompanying drawings shall be interpreted merely as examples illustrating the inventive concept herein and shall not be construed as limiting the invention.

Wherefore, I/We claim:

1. A mechanism for determining a position of a point relative to a coordinate system having one or more coordinate axis, comprising: a coordinate reference plane,
 a coordinate read plane generally parallel to and adjacent to the coordinate reference plane;
 a coordinate system defined by one or more coordinate scales for determining a relative position of a point on the coordinate read plane with respect to the coordinate system, each coordinate scale being aligned along a coordinate axis, and
 a read mechanism corresponding to and associated with each coordinate scale, wherein each read mechanism is coupled to the coordinate reference plane and to the coordinate read plane such that the read mechanism
 is responsive to motion of the coordinate read plane along a corresponding coordinate axis to indicate a position of the point on the coordinate read plane along the corresponding coordinate scale,
 allows transverse motion of the coordinate read plane with respect to the corresponding coordinate axis and includes
 a guide mechanism for retaining the read mechanism within a predetermined region along an axis transverse to the corresponding coordinate axis with motion of the coordinate read plane transverse to the axis of the coordinate scale
 wherein a coordinate scale of the coordinate system is fixed to the coordinate reference plane and has a coordinate axis extending generally along an axis of movement of the coordinate read plane, and
 each read mechanism is mechanically associated with the coordinate read plane and includes
 a coordinate read head movable along the coordinate scale with movement of the coordinate read plane with the read head reading a coordinate position from the coordinate scale, and
 a head track extending generally orthogonally to the axis of the coordinate scale with the read head being mechanically engaged with and moveable along the head track in a direction orthogonal to the axis of the coordinate scale, and
 the guide mechanism is mechanically and movably engaged with the read head and the coordinate scale to move the read head along the head track so that the read head is maintained in a predetermined region adjacent to the axis of the coordinate scale with motion of the coordinate read plane transverse to the axis of the coordinate scale.

2. The mechanism for determining the position of a point of claim 1, wherein:
 the coordinate reference plane and the corresponding coordinate read plane are locally generally parallel and orthogonal to one another in each position along the coordinate read axis the read head can assume along the coordinate axis, so that
  the guide mechanism can thereby position the read mechanism along the coordinate axis system during motion of the coordinate read plane along an axis transverse to the coordinate scale axis.

3. The mechanism for determining the position of a point of claim 1, wherein:
 a line between the read head and the coordinate axis defines a plane that, at each point along the read axis and a corresponding point on the coordinate axis, is flat along the line between the read head and the coordinate axis.

4. A positioning mechanism for determining a location of a point on a workable relative to a coordinate axis, comprising:
 p1 a coordinate scale fixed to a reference plane and having a coordinate axis extending generally along an axis of movement of the workable, and
 a coordinate read mechanism located on a coordinate read plate of the worktable, including a coordinate read head, wherein
 the coordinate read head is moveable along the coordinate scale with movement of the coordinate read plane with the read head reading a coordinate position from the coordinate scale,
 a head track extending generally orthogonally to the axis of the coordinate scale with the read head being mechanically engaged with and moveable along the head track in a direction orthogonal to the axis of the coordinate scale, and
 a guide mechanism mechanically and movably engaging the read head with the coordinate scale to move the read head along the head track to maintain the read head in a predetermined region adjacent to the axis of the coordinate scale with motion of the coordinate read plane transverse to the axis of the coordinate scale.

5. The positioning mechanism for determining a location of a point on a worktable relative to a coordinate axis of claim 4, wherein:
 the coordinate read plane and the coordinate reference plane are located in opposing facing proximity to minimize a separation between the coordinate scale and the read head.

6. The positioning system for determining first and second coordinates of a location of a point on a worktable relative to first and second coordinate axes, comprising:
 first and second coordinates scales fixed to a coordinate reference plane, each extending along one of the first and second coordinate axis and extending generally along a corresponding axis of movement of the coordinate reference plane, and
 first and second coordinate read mechanisms located on a coordinate read plane of the worktable, each coordinate read mechanism including
 a coordinate read head, wherein
 the coordinate read head is moveable along the corresponding coordinate scale with movement of the coordinate read plane along the corresponding coordinate axis and with read head reading a coordinate position from the corresponding coordinate scale,
 a head track extending generally orthogonally to the axis of the corresponding coordinate scale with the read being mechanically engaged with and moveable along the head track in a direction orthogonal to the axis of the corresponding coordinate scale, and
 a guide mechanism mechanically and movably engaging the read head with the corresponding coordinate scale to move the read head along the head track to maintain the read head in a predetermined region adjacent to the axis of the corresponding coordinate scale with motion of the coordinate read plane transverse to the axis of the cooresponding coordinate scale.

7. The positioning system for determining first and second coordinates of a location of a point on a worktable relative to first and second coordinate axes of claim 6, wherein:

the coordinate read plane and the coordinate reference plane are located in opposing facing proximity to minimize a separation between the coordinate scale and the read head.

8. The mechanism for determining the position of a point of claim 6, wherein:
the coordinate reference plane and the corresponding coordinate read plane are locally generally parallel and orthogonal to one another in each position along the coordinate read axis the read head can assume along the coordinate axis, so that
the guide mechanism associated with the read head can thereby position the read mechanism along the coordinate axis system during motion of the coordinate read plane along an axis transverse to the coordinate scale axis.

9. The mechanism for determining the position of a point of claim 6, wherein:
a line between a read head and the corresponding coordinate axis and defines a plane that, at each point along the read axis, and a corresponding point on the corresponding coordinate axis, is flat along the line between the read head and the coordinate axis.

10. The positioning system for determining first and second coordinates of a location of a point on a worktable relative to first and second coordinate axes of claim 6, wherein:
the coordinate reference plane is located on a fixed common base,
the worktable is mounted to a first positioning mechanism for moving the worktable along the first worktable axis of movement, and
the first positioning mechanism is mounted to a second positioning mechanism mounted to the fixed common base for moving the first positioning mechanism and the worktable along the second worktable axis of movement.

11. The positioning system for determining first and second coordinates of a location of a point on a worktable relative to first and second coordinate axes of claim 6, wherein:
the worktable includes
a coordinate read table bearing the coordinate read plane with the coordinate read plane adjacent the coordinate reference plane, and
a workpiece table for mounting an object to the worktable, wherein
the workpiece table is spaced apart from and attached to the coordinate read table by a work table support with the coordinate read table being located between the plane of the worktable and the coordinate reference plane.

12. The positioning system for determining first and second coordinates of a location of a point on a worktable relative to first and second coordinate axes of claim 7, wherein:
the reference plane surface is located on a fixed common base,
the worktable is mounted to a first positioning mechanism for moving the worktable along the first worktable axis of movement, and
the first positioning mechanism is mounted to a second positioning mechanism mounted to the fixed common base for moving the first positioning mechanism and the workable along the second worktable axis of movement.

13. A positioning system for determining first, second and third coordinates of a location of a point on a worktable relative to first, second and third coordinate axes, comprising:
first, second and third coordinate scales fixed to a coordinate reference plane, each extending along one of the first, second and third coordinate axis and extending generally along a corresponding axis of movement of the coordinate reference plane, and
first, second and third coordinate read mechanisms located on a coordinate read plane of the worktable, each coordinate read mechanisms including
a coordinate read head, wherein
the coordinate read head is movable along the corresponding coordinate scale with movement of the coordinate read plane along the corresponding coordinate axis and with the read head reading a coordinate position from the corresponding coordinate scale,
a head track extending generally orthogonally to the axis of the corresponding coordinate scale with the read head being mechanically engaged with and moveable along the head track in a direction orthogonal to the axis of the corresponding coordinate scale, and
a guide mechanism movably and mechanically engaging the read with the corresponding coordinate scale to move the read head along the head track to maintain the read head in a predetermined region adjacent to the axis of the corresponding coordinate scale with motion of the coordinate read plane transverse to the corresponding coordinate scale.

14. The positioning system for determining first, second and third coordinates of a location of a point on a worktable relative to first, second and third coordinate axes of claim 13, wherein:
the coordinate read plane and the coordinate reference plane are located in opposing facing proximity to minimize a separation between the coordinate scale and the read head.

15. The positioning system for determining first, second and third coordinates of a location of a point on a worktable relative to first, second and third coordinate axes of claim 13, wherein:
the coordinate reference plane is located on a fixed common base,
the worktable is mounted to a first positioning mechanism for moving the worktable along the first worktable axis of movement, and
the positioning mechanism is mounted to a second positioning mechanism mounted to a third axis common base for moving the first positioning mechanism and the worktable along the second worktable axis of movement,
a third positioning mechanism is connected between the third axis common base and the common base for moving the first and second positioning mechanisms and the worktable along the third worktable axis of movement, and
a third encoder scale is mounted to the common base while the third read mechanism is mounted to the third axis common base to determine a third axis coordinate along the third worktable axis of movement.

16. The positioning system for determining first, second and third coordinates of a location of a point on a worktable relative to first, second and third coordinate axes of claim 13, wherein:
the worktable includes
a coordinate read table bearing the coordinate read plane with the coordinate read plane adjacent the coordinate reference plane, and
a workpiece table for mounting an object to the worktable,
the workpiece table being spaced apart from and attached to the coordinate read table by a work table support with the coordinate read table being located between the workpiece table and the coordinate reference plane.

17. The positioning system for determining first, second and third coordinates of a location of a point on a worktable relative to first, second and third coordinate axes of claim 13, wherein:
the coordinate reference plane is located on a fixed common base,
the worktable is mounted to a first positioning mechanism for moving the worktable along the first worktable axis of movement, and
the first positioning mechanism is mounted to a second positioning mechanism mounted to the fixed common base for moving the first positioning mechanism and the worktable along the second worktable axis of movement.

18. A positioning system for determining coordinates of a location of a point on a worktable relative to each of a plurality of coordinate axes, comprising:
a plurality of coordinate scales fixed to a coordinate reference plane, each extending along one of the plurality of coordinate axes and extending generally along a corresponding axis of movement of the coordinate reference plane, and
a corresponding plurality of coordinate read mechanisms located on a coordinate read plane of the worktable, each coordinate read mechanism including a coordinate read head, wherein
the coordinate read head is movable the along the corresponding coordinate scale with movement of the coordinate read plane along the corresponding coordinate axis and with the read head reading a coordinate position from the corresponding coordinate scale,
a head track extending generally orthogonally to the axis of the corresponding coordinate scale with the read head being mechanically engaged with and moveable along the head track in a direction orthogonal to the axis of the corresponding coordinate scale, and
a guide mechanism mechanically and movably engaging the read head with the corresponding coordinate scale to move the read head along the head track to maintain the read head in a predetermined region adjacent to the axis of the corresponding coordinate scale with motion of the coordinate read plane transverse to the axis of the corresponding coordinate scale.

* * * * *